US012389211B2

(12) United States Patent
Hundert et al.

(10) Patent No.: US 12,389,211 B2
(45) Date of Patent: Aug. 12, 2025

(54) COMMUNICATION RESOURCE MANAGEMENT

(71) Applicant: QUALCOMM Incorporated, San Diego, CA (US)

(72) Inventors: Harel Hundert, Rosh Ha-Ayin (IL); Doron Baruch, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 486 days.

(21) Appl. No.: 17/908,120

(22) PCT Filed: Apr. 17, 2021

(86) PCT No.: PCT/US2021/027849
§ 371 (c)(1),
(2) Date: Aug. 30, 2022

(87) PCT Pub. No.: WO2021/221935
PCT Pub. Date: Nov. 4, 2021

(65) Prior Publication Data
US 2023/0101555 A1 Mar. 30, 2023

(30) Foreign Application Priority Data
Apr. 26, 2020 (IL) .......................................... 274235

(51) Int. Cl.
*H04W 4/40* (2018.01)
*H04B 7/06* (2006.01)
(Continued)

(52) U.S. Cl.
CPC ............ *H04W 4/38* (2018.02); *H04B 7/0617* (2013.01); *H04W 4/40* (2018.02); *H04W 24/02* (2013.01)

(58) Field of Classification Search
CPC .................................. H04W 4/38; H04W 4/30
(Continued)

(56) References Cited

U.S. PATENT DOCUMENTS

2016/0242229 A1* 8/2016 Balachandran ....... H04W 72/20
2017/0123428 A1 5/2017 Levinson et al.
(Continued)

FOREIGN PATENT DOCUMENTS

CN 103339796 A 10/2013
CN 103906129 A 7/2014
(Continued)

OTHER PUBLICATIONS

International Search Report and Written Opinion—PCT/US2021/027849—ISA/EPO—Jul. 5, 2021.

*Primary Examiner* — Qutbuddin Ghulamali
(74) *Attorney, Agent, or Firm* — Thien T. Nguyen

(57) ABSTRACT

A UE includes: at least one transceiver; a memory; one or more sensors configured to provide one or more sensor indications; and at least one processor. The sensor(s) includes at least one of: one or more first sensors configured to sense one or more environmental conditions; or one or more second sensors configured to sense one or more UE conditions. The processor(s) is configured to control operation, for communication with an entity external to the UE, of at least one of the processor(s) or the transceiver(s) based on the sensor indication(s) provided by the sensor(s) to affect at least one of: a communication directionality of the UE; or a transmit power of the transceiver(s); or a transmit frequency of the transceiver(s); or a processing effort of the processor(s) for processing communication signals.

26 Claims, 8 Drawing Sheets

(51) Int. Cl.
*H04W 4/38* (2018.01)
*H04W 24/02* (2009.01)

(58) Field of Classification Search
USPC .................................................... 455/414.1
See application file for complete search history.

(56) References Cited

U.S. PATENT DOCUMENTS

2018/0139593 A1* 5/2018 Chun .................... H04W 4/46
2018/0322784 A1 11/2018 Schild
2019/0245592 A1* 8/2019 Chae ................... H04B 7/0413

FOREIGN PATENT DOCUMENTS

| CN | 105409298 A | 3/2016 |
| CN | 110875765 A | 3/2020 |
| JP | 2008049873 A | 3/2008 |

\* cited by examiner

COMMUNICATION RESOURCE MANAGEMENT

CROSS-REFERENCE TO RELATED APPLICATIONS

This application is the National Stage of International Application No. PCT/US2021/027849, filed Apr. 17, 2021, entitled "COMMUNICATION RESOURCE MANAGEMENT," which claims the benefit of Israel Patent Application No. 274235, filed Apr. 26, 2020, entitled "COMMUNICATION RESOURCE MANAGEMENT," both of which are assigned to the assignee hereof, and the entire contents of which are hereby incorporated herein by reference for all purposes.

BACKGROUND

The connected-vehicle radio-frequency environment is a spectrum-limited, bandwidth-limited resource. For example, the available spectrum may be about 20 MHz at just under 6 GHz. This spectrum may be increasingly used as more radio-frequency-based connected-vehicle (e.g., vehicle to everything (V2X)) message exchanges occur. V2X may utilize several wireless technologies such as cellular, dedicated short range communications (DSRC), and other vehicular communication systems to exchange information between vehicles and other entities, to include roadside units (RSUs) and edge servers. Applications running on mobile devices are increasingly dependent on high-data rate services. For example, users may be able to view media data such as television and movies, as well as participate in video conference calls and networked based gaming. Often, mobile users may be concentrated in an area such as in a public transportation carrier (e.g., bus, train), or in an area of traffic congestion. Requests for high-data rate services from multiple mobile devices in a congested area can place large demands on a cellular network. The increased data demands may cause a degradation in the user experience in high-data rate application due to latency issues, reduced resolution video, and failed connections.

SUMMARY

An example user equipment (UE) includes: at least one transceiver configured to send and receive wireless signals, the at least one transceiver comprising one or more antennas; a memory; one or more sensors configured to provide one or more sensor indications, the one or more sensors comprising at least one of: one or more first sensors configured to sense one or more environmental conditions; or one or more second sensors configured to sense one or more UE conditions; and at least one processor communicatively coupled to the at least one transceiver, the memory, and the one or more sensors and configured to control operation, for communication with an entity external to the UE, of at least one of the at least one processor or the at least one transceiver based on the one or more sensor indications provided by the one or more sensors to affect at least one of: a communication directionality of the UE; or a transmit power of the at least one transceiver; or a transmit frequency of the at least one transceiver; or a processing effort of the at least one processor for processing communication signals.

Another example UE includes: sensing means for obtaining one or more sensor indications by sensing at least one of: one or more environmental conditions; or one or more UE conditions; and communication means for affecting communication between the UE and an external entity based on the one or more sensor indications by affecting at least one of: a communication directionality of the UE; or a transmit power of the UE; or a transmit frequency of the UE; or a processing effort of the UE for processing communication signals.

An example method of managing communication resources of a UE includes: obtaining one or more sensor indications by sensing, at the UE, at least one of: one or more environmental conditions; or one or more UE conditions; and affecting communication between the UE and an external entity, disposed externally to the UE, based on the one or more sensor indications by affecting at least one of: a communication directionality of the UE; or a transmit power of the UE; or a transmit frequency of the UE; or a processing effort of the UE for processing communication signals.

A non-transitory, processor-readable storage medium includes processor-readable instructions configured to cause one or more processors of a UE to: obtain one or more sensor indications of at least one of: one or more environmental conditions; or one or more UE conditions; and affect communication between the UE and an external entity, disposed externally to the UE, based on the one or more sensor indications by affecting at least one of: a communication directionality of the UE; or a transmit power of the UE; or a transmit frequency of the UE; or a processing effort of the UE for processing communication signals.

DETAILED DESCRIPTION

Techniques are discussed herein for managing communication resources. For example, a UE (user equipment), such as a vehicle, may use information sensed by one or more sensors to control one or more resources for use in communication, e.g., vehicle-to-everything (V2X) communication. For example, the UE may use information from one sensor, a combination of information from multiple sensors, and/or a change in sensed information from one or more sensors over time to determine how to allocate communication resources. The allocation of resources may be done for any of a variety of reasons or combinations of reasons, e.g., to reduce wasted effort, increase likelihood of successful communication, and/or reduce redundancy. For example, the UE may allocate more resources to communication in a direction of travel, fewer resources to communication in a direction away from a direction of travel, and/or fewer resources in a direction obstructed by an obstacle. As another example, the UE may allocate fewer resources for communication if the UE is part of a group of UEs and the information to be provided by the UE would be redundant with information provided by another of the UEs in the group. These are examples, and other examples may be implemented. For example, one or more decisions regarding resource allocation may be made outside of a UE and conveyed to the UE for implementation. Still other examples may be implemented.

Items and/or techniques described herein may provide one or more of the following capabilities, as well as other capabilities not mentioned. Processing efficiency may be improved or maintained, e.g., by avoiding redundant processing, processing transmit signals that are likely to reach a desired destination, preventing processing of transmit signals with significant impediments to reaching a desired destination successfully, and/or processing received signals that are more significant than other received signals. Processing power may be conserved or improved, e.g., by limiting unnecessary and/or unproductive processing and thus reducing heat production by a processor. Safety may be improved, e.g., by reducing interference with communications to and/or from an emergency vehicle. One or more UE resources may be better utilized, e.g., optimized, based on one or more sensor measurements indicative of an environment of the UE and/or a situation of the UE. Other capabilities may be provided and not every implementation according to the disclosure must provide any, let alone all, of the capabilities discussed. It may be possible for an effect noted above to be achieved by means other than that noted, and a noted item/technique may not necessarily yield the noted effect.

Figure 1:
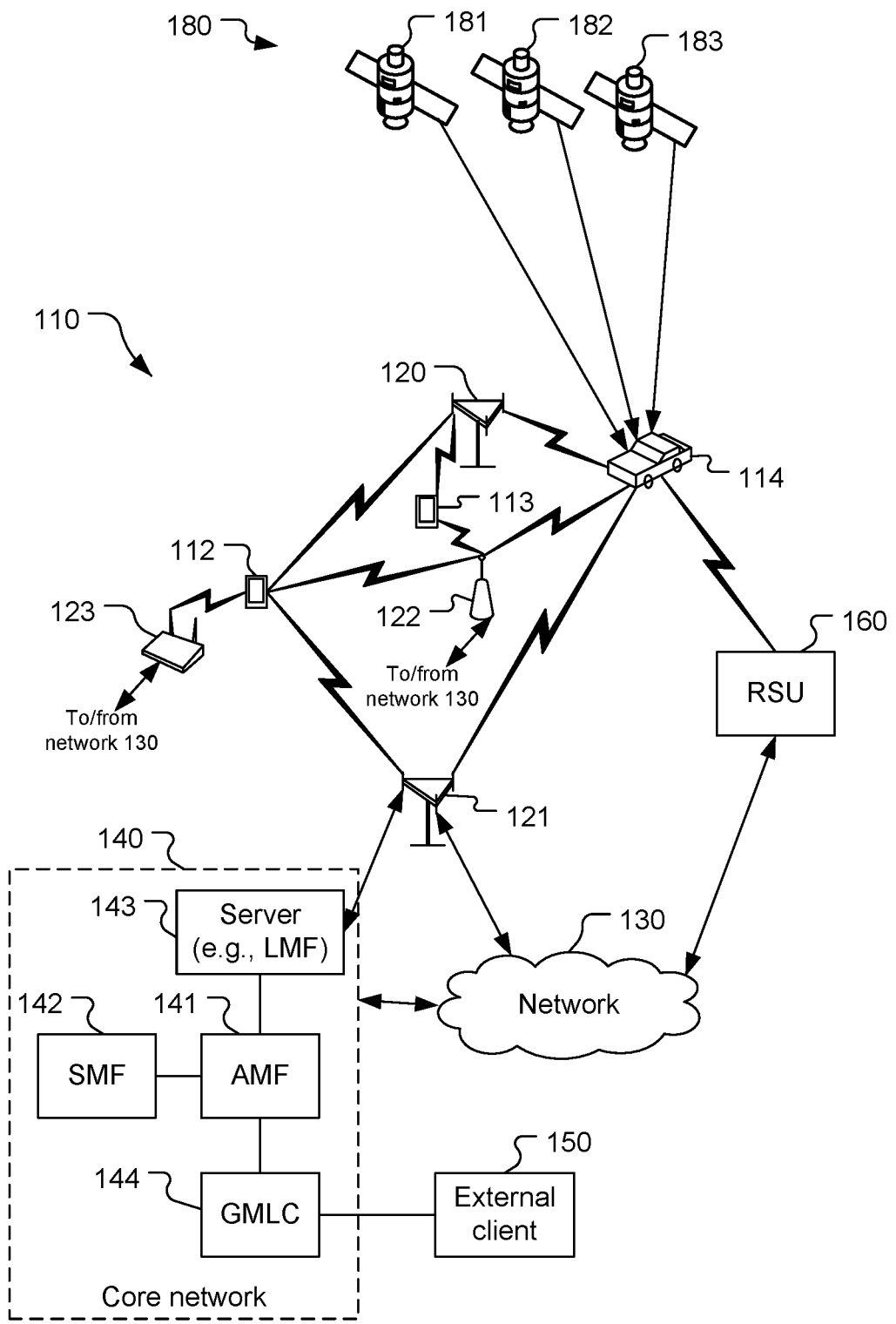
FIG. 1 is a schematic diagram of a connected-vehicle communication system.

Referring to FIG. 1, an example wireless communications system 110 includes a user equipment (UE) 112, a UE 113, a UE 114, base transceiver stations (BTSs) 120, 121, 122, 123, a network 130, a core network 140, an external client 150, and a roadside unit (RSU) 160. The core network 140 (e.g., a 5G core network (5GC)) may include back-end devices including, among other things, an Access and Mobility Management Function (AMF) 141, a Session Management Function (SMF) 142, a server 143, and a Gateway Mobile Location Center (GMLC) 144. The AMF 141, the SMF 142, the server 143, and the GMLC 144 are communicatively coupled to each other. The server 143 may be, for example, a Location Management Function (LMF) that supports positioning of the UEs 112-114 (e.g., using techniques such as Assisted Global Navigation Satellite System (A-GNSS), OTDOA (Observed Time Difference of Arrival, e.g., Downlink (DL) OTDOA and/or Uplink (UL) OTDOA), Round Trip Time (RTT), Multi-Cell RTT, RTK (Real Time Kinematic), PPP (Precise Point Positioning), DGNSS (Differential GNSS), E-CID (Enhanced Cell ID), AoA (Angle of Arrival), AoD (Angle of Departure), etc.). The RSU 160 may be configured for communication (e.g., bi-directional or uni-directional communication) with the UEs 112-114). For example, the RSU 160 may be configured with similar communication capabilities to any of the BTSs 120-123, but perhaps with different functionality(ies) (e.g., different programming). Also, while one RSU 160 is shown in FIG. 1, the system 100 may include more than one RSU, or may not include any RSUs. The communication system 110 may include additional or alternative components.

The communication system 110 may utilize information from a constellation 180 of satellite vehicles (SVs) 181, 182, 183. The constellation 180 may correspond to a respective Global Navigation Satellite System (GNSS) (i.e., Satellite Positioning System (SPS)) such as the Global Positioning System (GPS), the GLObal NAvigation Satellite System (GLONASS), Galileo, Beidou, or some other local or regional SPS such as the Indian Regional Navigational Satellite System (IRNSS), the European Geostationary Navigation Overlay Service (EGNOS), or the Wide Area Augmentation System (WAAS). Only three SVs are shown for the constellation 180, but constellations of GNSS SVs will include more than three SVs.

An LMF may also be referred to as a Location Manager (LM), a Location Function (LF), a commercial LMF (CLMF), or a value-added LMF (VLMF). The server 143 (e.g., an LMF) and/or one or more other devices of the system 110 (e.g., one or more of the UEs 112-114) may be configured to determine locations of the UEs 112-114. The server 143 may communicate directly with the BTS 121 (e.g., a gNB) and/or one or more other BTSs, and may be integrated with the BTS 121 and/or one or more other BTSs. The SMF 142 may serve as an initial contact point of a Service Control Function (SCF) (not shown) to create, control, and delete media sessions. The server 143 (e.g., an LMF) may be co-located or integrated with a gNB or a TRP (Transmission/Reception Point), or may be disposed remote from the gNB and/or TRP and configured to communicate directly or indirectly with the gNB and/or the TRP.

The AMF 141 may serve as a control node that processes signaling between the UEs 112-114 and the core network 140, and provides QoS (Quality of Service) flow and session management. The AMF 141 may support mobility of the UEs 112-114 including cell change and handover and may participate in supporting signaling connection to the UEs 112-114.

The system 110 is capable of wireless communication in that components of the system 110 can communicate with one another (at least some times using wireless connections) directly or indirectly, e.g., via the BTSs 120-123 and/or the network 130 (and/or one or more other devices not shown, such as one or more other base transceiver stations). While the BTSs 120-123 are shown separately from the network 130, the network 130 may include one or more of the BTSs 120-123 and may constitute a Radio Access Network (RAN), e.g., a New Radio (NR) RAN which may also be called a Fifth Generation (5G) Next Generation (NG) RAN (NG-RAN). For indirect communications, the communications may be altered during transmission from one entity to another, e.g., to alter header information of data packets, to change format, etc. The UEs 112-114 may communicate with the BTSs 120-123 via Uu interfaces, e.g., in RRC-encapsulated LPP messages (Radio Resource Control encapsulated LTE Positioning Protocol messages) over Uu interfaces. The UEs 112-114 shown are a smartphone, a tablet computer, and a vehicle-based device, but these are examples only as the UEs 112-114 are not required to be any of these configurations, and other configurations of UEs may be used. The UEs 112, 113 shown are mobile wireless communication devices (although they may communicate wirelessly and via wired connections) including mobile phones (including smartphones) and a tablet computer. The UE 114 shown is a vehicle-based mobile wireless communication device (although the UE 114 may communicate wirelessly and via wired connections). Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 110 and may communicate with each other and/or with the UEs 112-114, the BTSs 120-123, the network 130, the core network 140, and/or the external client 150. For example, such other devices may include internet of thing (IoT) devices, medical devices, home entertainment and/or automation devices, etc. The core network 140 may communicate with the external client 150 (e.g., a computer system), e.g., to allow the external client 150 to request and/or receive location information regarding the UEs 112-114 (e.g., via the GMLC 144).

The UEs 112-114 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 110 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The BTSs 120-123 may wirelessly communicate with the UEs 112-114 in the system 110 via one or more antennas. A BTS may also be referred to as a base station, an access point, a gNode B (gNB), an access node (AN), a Node B, an evolved Node B (eNB), etc. For example, each of the BTSs 120, 121 may be a gNB or a transmission point gNB, the BTS 122 may be a macro cell (e.g., a high-power cellular base station) and/or a small cell (e.g., a low-power cellular base station), and the BTS 123 may be an access point (e.g., a short-range base station configured to communicate with short-range technology such as WiFi, WiFi-Direct (WiFi-D), Bluetooth®, Bluetooth®-low energy (BLE), Zigbee, etc. One or more of the BTSs 120-123 may be configured to communicate with the UEs 112-114 via multiple carriers. Each of the BTSs 120, 121 may provide communication coverage for a respective geographic region, e.g. a cell. Each cell may be partitioned into multiple sectors as a function of the base station antennas.

The BTSs 120-123 each comprise one or more Transmission/Reception Points (TRPs). For example, each sector within a cell of a BTS may comprise a TRP, although multiple TRPs may share one or more components (e.g., share a processor but have separate antennas). The system 110 may include only macro TRPs or the system 110 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

The UEs 112-114 may be referred to as terminals, access terminals (ATs), mobile stations, mobile devices, subscriber units, etc. The UEs 112-114 may include various devices as listed above and/or other devices. The UEs 112-114 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of the UEs 112-114 utilizing D2D communications may be within a geographic coverage area of a TRP such as one or more of the BTSs 120-123. Other UEs in such a group may be outside such geographic coverage areas, or be otherwise unable to receive transmissions from a base station. Groups of the UEs 112-114 communicating via D2D communications may utilize a one-to-many (1:M) system in which each UE may transmit to other UEs in the group. A TRP of the BTSs 120-123 may facilitate scheduling of resources for D2D communications. In other cases, D2D communications may be carried out between UEs without the involvement of a TRP.

Figure 2:
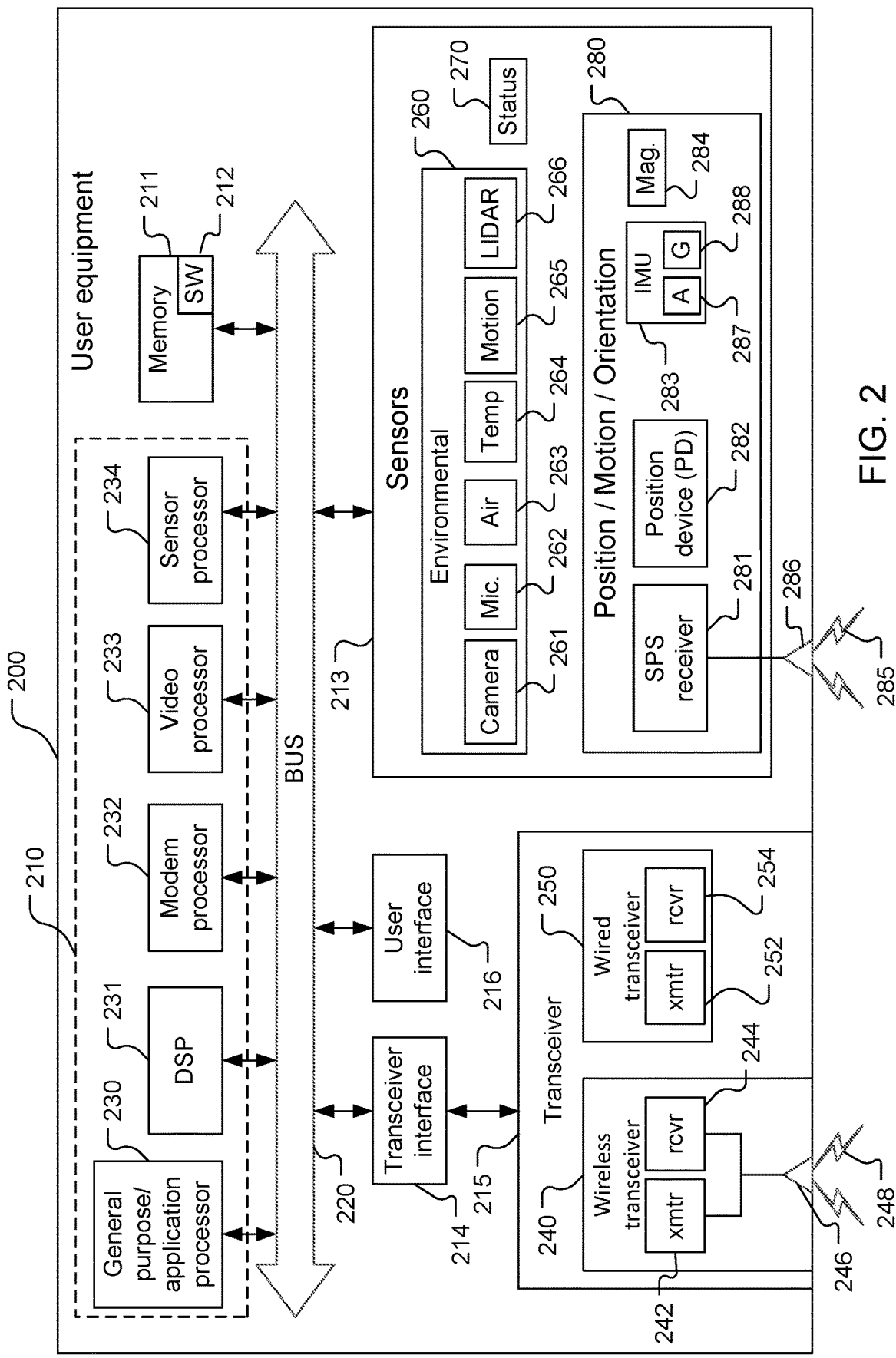
FIG. 2 is a block diagram of components of an example of a user equipment shown in FIG. 1.

Referring also to FIG. 2, a UE 200 is an example of any of the UEs 112, 113, 114 and comprises a computing platform including a processor 210, memory 211 including software (SW) 212, one or more sensors 213, a transceiver interface 214 for a transceiver 215 (that includes a wireless transceiver 240 and a wired transceiver 250), and a user interface 216. The processor 210, the memory 211, the sensor(s) 213, the transceiver interface 214, and the user interface 216 may be communicatively coupled to each other by a bus 220 (which may be configured, e.g., for optical and/or electrical communication). One or more of the components shown (e.g., one or more of the sensors 213, etc.) may be omitted from the UE 200.

The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the aspects and features of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensors 213, the user interface 216, and/or the wired transceiver 250.

The UE 200 may comprise the modem processor 232 that may be capable of performing baseband processing of signals received and down-converted by the transceiver 215 and/or the SPS receiver 281 (discussed below). The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 includes the sensors 213 that may include one or more of various types of sensors, for example, an environmental sensor 260, a status sensor 270, and a position/motion/orientation (PMO) sensor 280. The PMO sensor 280 may include one or more sensors from which position and/or motion and/or orientation of the UE 200 may be determined. While each of the sensors 260, 270, 280 may be referred to in the singular, each of the sensors 260, 270, 280 may include more than one sensor, examples of some of which are discussed explicitly herein. The sensors 213 may generate analog and/or digital signals indications of which may be stored in the memory 211 and processed by the processor 210 (e.g., the processor 230, the DSP 231, the video processor 233, and/or the sensor processor 234 as appropriate) in support of one or more applications such as, for example, applications directed to positioning, navigation, and/or resource management. The description herein may refer to the processor 210 generally as performing one or more functions that one or more of the processors 230-234 perform.

The sensor(s) 213 may be used in resource management, relative location measurements, relative location determination, motion determination, etc. Information detected by the sensor(s) 213 may be used to determine how to allocate resources of the UE 200, e.g., transmission power, processing power for transmission and/or reception of communication signals, transmission and/or reception directionality, etc. The plural term "resources" is often used throughout the discussion herein, but this term includes the singular as well, i.e., a single resource, e.g., being allocated. Also or alternatively, information detected by the sensor(s) may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the server 143 regarding the mobility of the UE 200. For example, based on the information obtained/measured by the sensor(s) 213, the UE 200 may notify/report to the server 143 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle, size (e.g., width and/or height), and/or orientation of another device with respect to the UE 200, etc. The position and/or motion of the UE 200 may be used in determining resource allocation for communication, e.g., between vehicles. The UE 200 may, for example, be disposed in or integrated with a vehicle. For example, the UE 200 may be the UE 114 that is a vehicle, in the example shown in FIG. 1, a car, although other forms of vehicles may be used, e.g., trucks, aerial UEs such as drones, etc. As such, the UE 200 may be configured for various forms of communication, e.g., V2V (vehicle-to-vehicle), V2X (vehicle-to-everything), CV2X (cellular V2X), CV2V (cellular V2V), etc.

The environmental sensor 260 may include one or more sensors for measuring one or more internal and/or external environmental conditions. In this example, the environmental sensor 260 includes a camera 261, a microphone 262, an air-flow sensor 263, a temperature sensor 264, a motion sensor 265, and a LIDAR (Light Detection and Ranging) sensor 266. While each of the sensors 261-266 may be referred to in the singular, each of the sensors 261-266 may include more than one sensor, examples of some of which are discussed explicitly herein. For example, the camera 261 may include at least one camera configured (e.g., designed, made, disposed, and directed) to capture images external to the UE 200 and/or may include one or more cameras configured to capture images internal to the UE 200 (e.g., in a passenger compartment of a vehicle). As other examples, the microphone 262, the temperature sensor 264, and/or the motion sensor 265 may include multiple microphones, multiple thermometers, and/or multiple motion detectors configured to detect sound, temperature, and/or motion (respectively) outside and/or inside of the UE 200, e.g., a vehicle. Indeed, any of the sensors 261-265 may include multiple respective sensors outside the vehicle and/or multiple respective sensors inside the vehicle for making respective measurements at multiple locations about the vehicle and/or in different directions relative to the vehicle. While this discussion assumes the UE 200 is a vehicle, the UE 200 may be a different device (i.e., other than a vehicle). The sensors 261-265 are examples and one or more of the sensors 261-265 may be omitted from the UE 200 and/or one or more other sensors may be included in the UE 200. For example, the environmental sensor 260 may include one or more barometric pressure sensors and/or one or more ambient light sensors and/or one or more other sensors.

The camera 261 may be configured for capturing still and/or moving imagery. For example, each camera of the camera 261 may comprise, for example, one or more imaging sensors (e.g., a charge coupled device (CCD) or a CMOS imager), one or more lenses, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The motion detector 265 is configured to detect motion. For example, the motion detector 265 may send and receive sound waves (e.g., ultrasound signals) and analyze the received signals for Doppler effects indicative of motion.

Use of multiple motion detectors may help identify the relative location (e.g., direction relative to the UE 200) of an object.

The LIDAR sensor 266 is configured to determine range to an object, which may be used by the processor 210 to detect the presence of an object. Use of multiple LIDAR sensors may help identify the relative location (e.g., direction relative to the UE 200) of an object. The LIDAR sensor 266 may be called a LADAR (laser radar) sensor, as is common when using a LIDAR sensor for detecting relatively small objects such as vehicles or other artificial (human-made) objects.

The status sensor 270 is configured to provide one or more indications of one or more UE conditions of the UE 200 indicative of UE status. For example, UE conditions where the UE 200 is a vehicle (with UE conditions thus being vehicle conditions) may include a gear status of the vehicle (e.g., whether the vehicle is in park, drive, or neutral, or in which gear the vehicle is presently (e.g., reverse, first, second, third, fourth, etc.)). Another vehicle condition may be whether an emergency brake is engaged. Another vehicle condition may be whether a main brake is presently engaged and possibly engaged to what degree. Another vehicle condition may be whether an accelerator is presently engaged and possibly to what degree. Another vehicle condition may be the status of the steering wheel (e.g., turned which way and how much) and/or wheel(s) directing the vehicle (e.g., direction of front wheels). Other example vehicle conditions may include whether a right-turn indicator is actuated, whether a left-turn indicator is actuated, and/or whether hazard lights (also called "four ways" or emergency flashers, etc.) are actuated. Another example vehicle condition may include tire status (e.g., tire pressure, rate of tire pressure change (e.g., to indicate a flat or blowout)). Another example vehicle condition is speed, e.g., as registered by a speedometer of the vehicle and/or determined by other means (e.g., using the PMO sensor 280). These vehicle conditions are examples, and one or more other sensors may be provided to sense one or more other vehicle conditions. Further, numerous other UE conditions may be sensed and indicated where the UE 200 is not a vehicle or is not associated with a vehicle.

The PMO sensor 280 may include one or more sensors for providing one or more UE conditions such as, for example, vehicle conditions. For example, the PMO sensor 280 may include one or more sensors for measuring information from which position and/or motion and/or orientation of the UE 200 may be determined and possibly determining position and/or motion (e.g., speed and/or direction of motion) and/or orientation of the UE 200. In this example, the PMO sensor 280 includes a Satellite Positioning System (SPS) receiver 281, a position device (PD) 282, an Inertial Measurement Unit (IMU) 283, and a magnetometer 284. The components of the PMO sensor 280 shown are examples, and one or more of these components may be omitted and/or one or more other components included in the PMO sensor 280. Also, while each of the components 281-284 of the PMO sensor 280 may be referred to in the singular, each of the components 281-284 may include more than one such component, examples of some of which are discussed explicitly herein. Also, the PD 282 may be part of the SPS receiver 281 and/or the IMU 283 and/or part of the processor 210, and may not be a sensor itself (e.g., may not take measurements), but may process information from one or more of the sensors 281, 283, 284 and/or one or more other sensors. The PMO 280 may be used to determine UE speed and/or direction of motion, e.g., by determining UE location over time (e.g., determined using SPS, one or more ranging sensors, etc.).

The IMU 283 may comprise one or more inertial sensors, for example, an accelerometer 287 (e.g., responding to acceleration of the UE 200 in three dimensions) and/or a gyroscope 288. While each of the sensors 287, 288 may be referred to in the singular, each of the sensors 287, 288 may include more than one sensor. The accelerometer may include one or more three-dimensional accelerometers and the gyroscope may include one or more three-dimensional gyroscopes. The IMU 283 may be configured to provide measurements about a direction of motion and/or a speed of motion of the UE 200, which may be used, for example, in relative location determination. For example, the accelerometer 287 and/or the gyroscope 288 of the IMU 283 may detect, respectively, a linear acceleration and a speed of rotation of the UE 200. The linear acceleration and speed of rotation measurements of the UE 200 may be integrated over time (e.g., by the IMU 283 and/or the PD 282) to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 281 (and/or by some other means) for a moment in time and measurements from the accelerometer 287 and the gyroscope 288 taken after this moment in time may be used in dead reckoning to determine a present location of the UE 200 based on movement (direction and distance) of the UE 200 relative to the reference location.

The magnetometer 284 may determine magnetic field strengths in different directions which may be used to determine orientation of the UE 200, which may be used, for example, to provide a digital compass for the UE 200. The magnetometer 284 may include a two-dimensional magnetometer configured to detect and provide indications of magnetic field strength in two orthogonal dimensions. Also or alternatively, the magnetometer 284 may include a three-dimensional magnetometer configured to detect and provide indications of magnetic field strength in three orthogonal dimensions. The magnetometer 284 may provide means for sensing a magnetic field and providing indications of the magnetic field, e.g., to the processor 210. The magnetometer 284 may provide measurements to determine orientation (e.g., relative to magnetic north and/or true north) that may be used for any of a variety of purposes, e.g., to support one or more compass applications. While referred to in the singular, the magnetometer 284 may include multiple magnetometers.

The SPS receiver 281 (e.g., a Global Positioning System (GPS) receiver or other Global Navigation Satellite System (GNSS) receiver) may be capable of receiving and acquiring SPS signals 285 via an SPS antenna 286. The antenna 286 is configured to transduce the wireless SPS signals 285 to wired signals, e.g., electrical or optical signals, and may be integrated with the antenna 246. The SPS receiver 281 may be configured to process, in whole or in part, the acquired SPS signals 285 for estimating a location of the UE 200. For example, the SPS receiver 281 may be configured to determine location of the UE 200 by trilateration using the SPS signals 285. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 281. The memory 211 may store indications (e.g., measurements) of the SPS signals 285 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200. Also or alternatively, some or all of the position determination signal processing may be performed by the PD 282.

The position device (PD) 282 may be configured to determine a position of the UE 200 (including absolute and/or relative position of the UE 200), motion of the UE 200, and/or time. For example, the PD 282 may communicate with, and/or include some or all of, the SPS receiver 281. The PD 282 may use measurements from the SPS receiver 281 and/or the IMU 283 and/or the magnetometer 284 to determine position and/or motion of the UE 200, e.g., using trilateration and/or dead reckoning. The PD 282 may work in conjunction with the processor 210 and the memory 211 as appropriate to perform at least a portion of one or more positioning methods (to determine location of the UE 200), although the description herein may refer only to the PD 282 being configured to perform, or performing, one or more operations in accordance with the positioning method(s). The PD 282 may also or alternatively be configured to determine location of the UE 200 using terrestrial-based signals (e.g., at least some of signals 248 discussed below) for trilateration, for assistance with obtaining and using the SPS signals 285, or both. The PD 282 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 282 may be configured to provide indications of uncertainty and/or error in the determined position and/or motion. Functionality of the PD 282 may be provided in a variety of manners and/or configurations, e.g., by the general purpose/application processor 230, the transceiver 215, the SPS receiver 281, and/or another component of the UE 200, and may be provided by hardware, software, firmware, or various combinations thereof.

The transceiver 215 may include a wireless transceiver 240 and/or a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired signals to the wireless signals 248. The wireless transceiver 240 may be configured for wireless communication to send communications to, and receive communications from, a variety of entities such as other UEs, base stations, etc. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may communicate with the network 130, e.g., to send communications to, and receive communications from, a gNB, for example. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The wireless transceiver 240 may be configured for beam management to affect directionality of the wireless transceiver 240, e.g., of the antenna 246. For example, the wireless transceiver 240 may be configured to implement beam forming for transmission and/or reception of the signals 248. The antenna 246 may include multiple antennas that are configured, e.g., designed, made, disposed, and directed to point in different directions relative to a body of the UE 200. One or more of such antennas may be capable of electronic beam steering (e.g., using appropriate phase shifts of elements of the antenna) and/or mechanical beam steering. Also or alternatively, the transceiver 240 may be configured to selectively (e.g., under direction/control of the processor 210) transmit from one or more antennas and/or to selectively process signals (e.g., to pass from the transceiver 215 to the processor 210 or to process by the processor 210) received from one or more antennas.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

Figure 3:
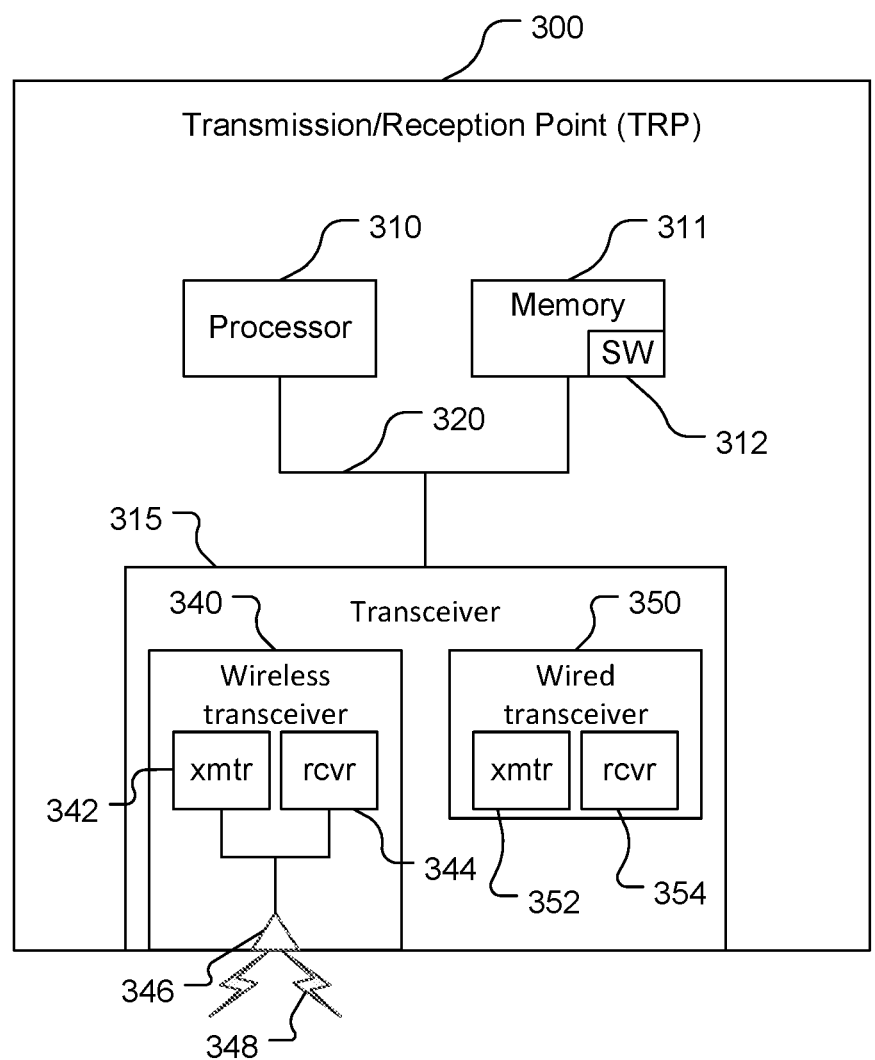
FIG. 3 is a block diagram of components of an example transmission/reception point shown in FIG. 1.

Referring also to FIG. 3, an example of a TRP 300 of the BTSs 120-123 and/or the RSU 160 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BTSs 120-123 or the RSU 160) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may communicate with the network 130, e.g., to send communications to, and receive communications from, the server 143, for example. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the aspects and features of the disclosure, including the claims, and other configurations may be used. For example, the description herein discusses that the TRP 300 is configured to perform or performs several functions, but one or more of these functions may be performed by the server 143 and/or the UE 200 (i.e., the server 143 and/or the UE 200 may be configured to perform one or more of these functions).

Figure 4:
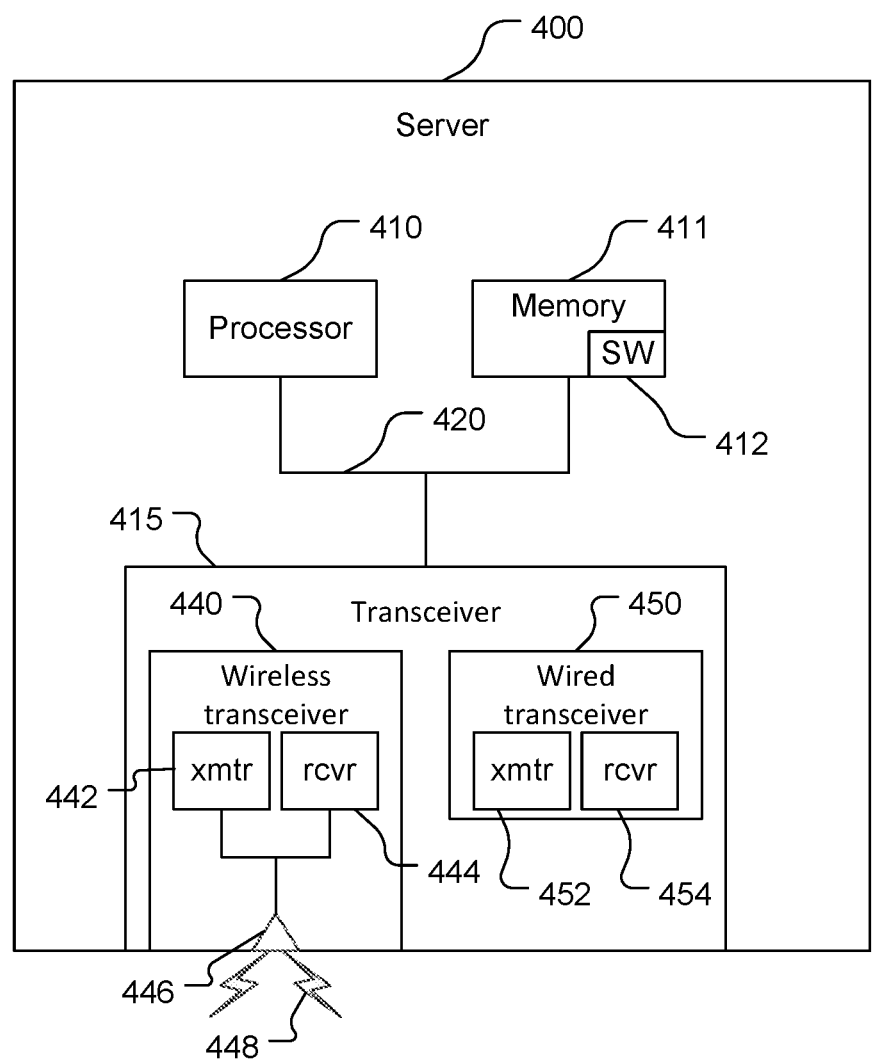
FIG. 4 is a block diagram of components of an example of a server shown in FIG. 1.

Referring also to FIG. 4, a server 400, which is an example of the server 143, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may communicate with the network 130 to send communications to, and receive communications from, the TRP 300, for example. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the aspects and features of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5:
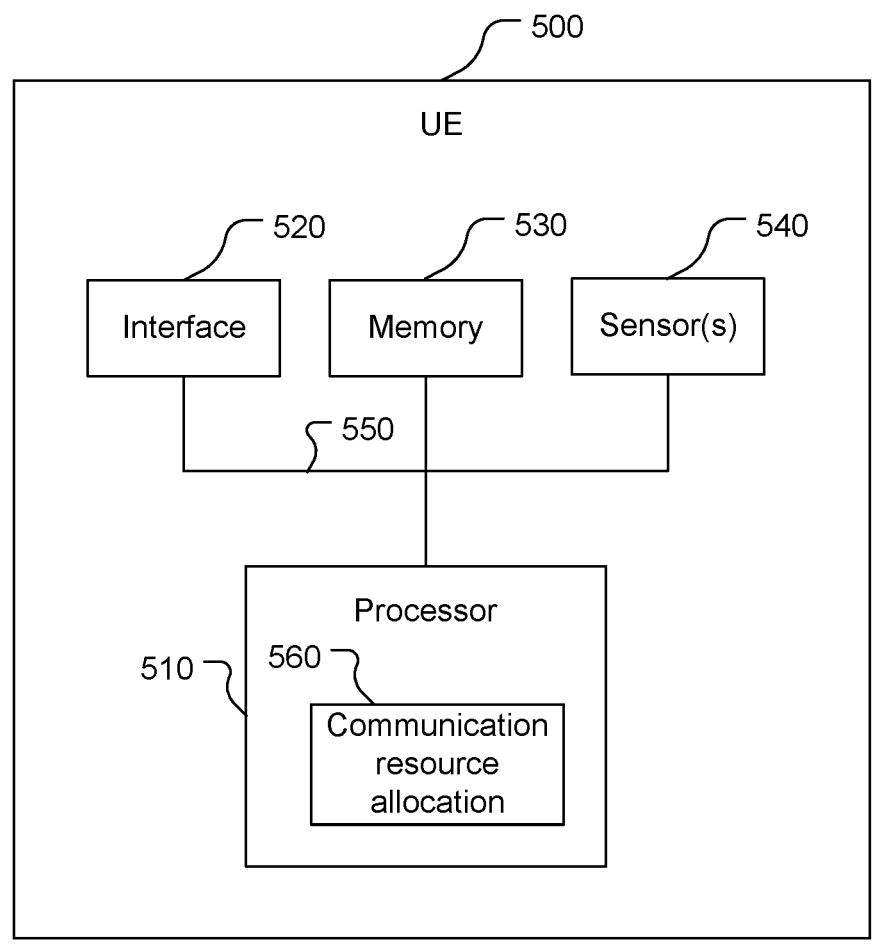
FIG. 5 is a block diagram of components of an example user equipment.

Referring to FIG. 5, with further reference to FIGS. 1-4, a UE 500 includes a processor 510, an interface 520, a memory 530, and one or more sensors 540 communicatively coupled to each other by a bus 550. The UE 500 may include the components shown in FIG. 5, and may include one or more other components such as any of those shown in FIG. 2 such that the UE 200 may be an example of the UE 500. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. The memory 530 may be configured similarly to the memory 211, e.g., including software with processor-readable instructions configured to cause the processor 510 to perform functions. The sensor(s) 540 may include one or more of the sensors in the sensor(s) 213. For example, the sensor(s) 540 may include one or more environmental sensors and/or one or more sensors (e.g., the status sensor 270 and/or the PMO sensor 280, or one or more portions thereof) for providing one or more indications of one or more UE conditions. The processor 510 may be configured similarly to the processor 210 or may include a subset of the components of the processor 210 and/or one or components in additions to the components of the processor 210. The description may refer only to the processor 510 performing a function, but this includes other implementations such as where the processor 510 executes software (stored in the memory 530) and/or firmware. The description may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520) includes a communication resource allocation unit 560 configured to allocate resources of the UE 200 for communication as discussed herein. The functional unit 560 is discussed further below, and the description may refer to the processor 510 generally, or the UE 500 generally, as performing any of the functions of the functional unit 560.

The communication resource allocation unit 560 is configured to determine and control which resources to use for communication. The unit 560 may be configured to use information from the sensor(s) 540, the location(s) of the sensor(s) in the UE 500, coverage area(s) of the sensor(s) 540 (e.g., a field of view of a camera), etc. to draw conclusions from the information provided by the sensor(s) 540 that may affect how the unit 560 allocates one or more resources (e.g., (usage of) one or more components of the UE 500, energy used by the UE 500, etc.) for communication. The unit 560 may, for example, determine directionality and/or power to use for communication transmission and/or reception, and/or may determine a quantity of antenna beams and/or a quantity of antennas to use for transmission and/or reception, and/or may determine processing effort (also referred to herein as processing level) (e.g., processing power, bandwidth, and/or time) for communication transmission and/or reception. The unit 560 may, for example, save power by selectively transmitting and/or receiving with less than full bandwidth and/or by selectively reducing a message repetition (i.e., how many times that a message is repeatedly transmitted). The unit 560 may use power and/or beam management to allocate communication resources, e.g., as discussed herein.

Figure 6:
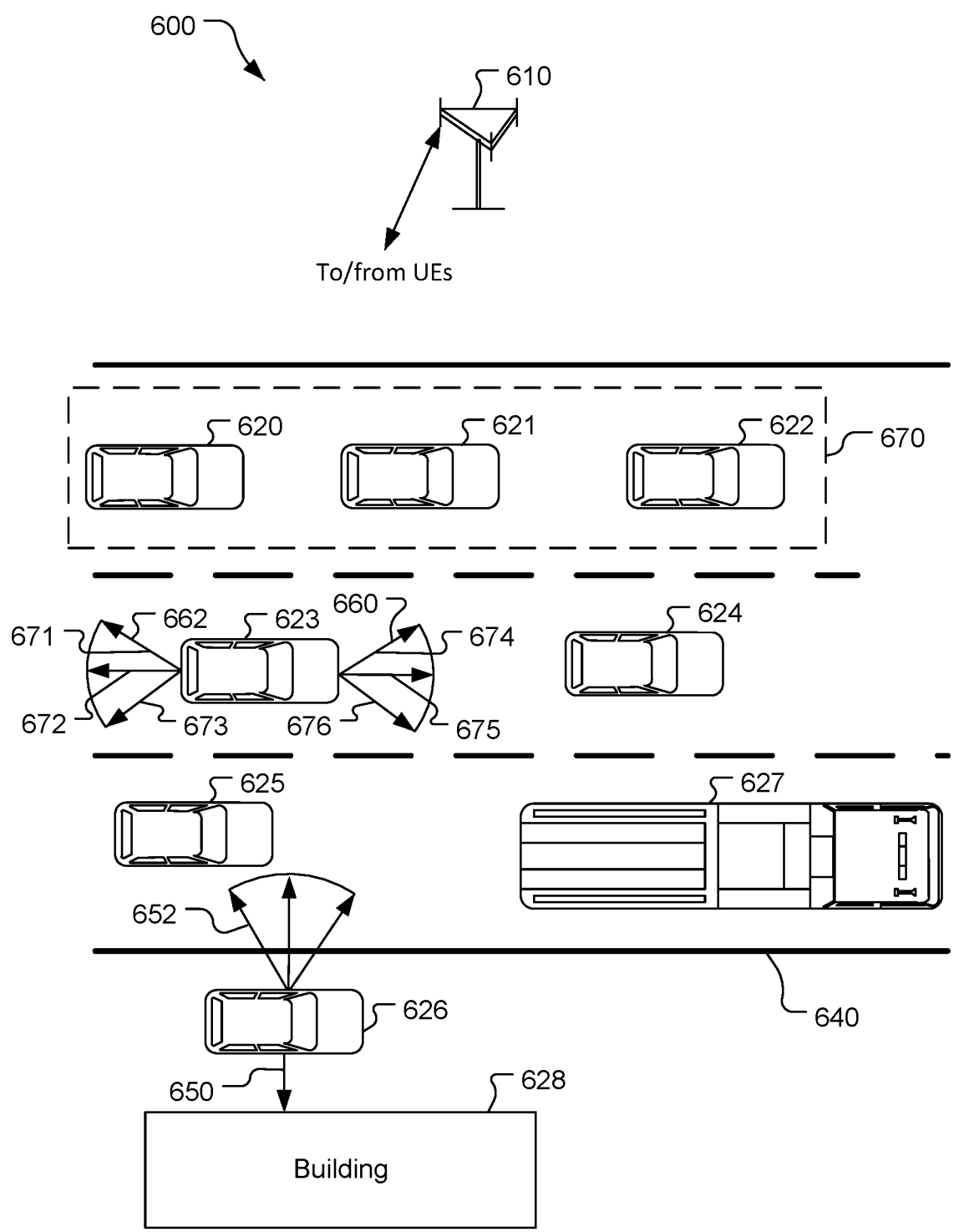
FIG. 6 is a top view of an example environment with multiple UEs.

Referring also to FIG. 6, an environment 600 includes a base station 610, UEs 620, 621, 622, 623, 624, 625, 626, an emergency vehicle 627 (here a fire engine), and a building 628. In this example, the UEs 620-626 are vehicles, e.g., integrated into the vehicles, although one or more UEs may be associated with, but not integrated into, one or more respective vehicles, or not associated with a vehicle. In this example, each of the UEs 620-626 is an example of the UE 500. The UEs 620-626 may be configured to use CV2X to communicate with each other, being configured to send and receive signals to and from each other. The UEs 620-626 may also be configured to send and receive various types of messages to and from the base station 610, here a roadside equipment (RSE) base station. The description may refer to the UE 500 (and/or or one more components of the UE 500) with respect to any of the UEs 620-626 (because the UEs 620-626 are examples of the UE 500) and may refer to specific ones of the UEs 620-626 as examples of the UE 500 as appropriate.

The UE 500 may be configured to broadcast messages, via the interface 520, for receipt by any device within communication range (based on the RAT (Radio Access Technology) used to transmit the messages and other conditions, e.g., environment, weather, etc.) of the UE 500. For example, the UE 500 may be configured to produce and send position messages, standalone transaction messages (STMs), and/or embedded transaction messages (ETMs) that are transaction messages embedded in position messages. The STMSs may include private information, e.g., a token, that is associated with and identifies the UE 500. The position messages and the ETMs may include position information (e.g., UE location (position) and possibly including uncertainty and/or error) for the UE 500. The position information may include motion information (i.e., changing-position information) for the UE 500. For example, the position messages and the ETMs may include a position of the UE 500 relative to a reference point (e.g., center of the Earth, or a point on a surface of the Earth, etc.) and may include information indicative of kinematic state of the UE 500, e.g., a velocity vector and/or an acceleration vector. The position messages may comprise Basic Safety Messages (BSMs) and/or other messages. The position messages may be conveyed, e.g., using V2X technology such as C-V2X and/or DSRC. The ETMs may include the position information (possibly including motion information) as well as private information identifying the UE 500 as found in STMs. The position and/or motion information of the position messages and/or the ETMs may be used by any of the other UEs for various purposes such as collision avoidance (e.g., blind-zone object detection), other safety-related purposes, and/or other purposes, whether safety related or not.

The UE 500 may be configured to use one of more indications from one or more of the sensor(s) 540 to determine whether and how to affect communication operation of the UE 500, e.g., communication transmission, communication reception, and/or communication signal processing, and to control the communication operation accordingly. The processor 510 (e.g., the communication resource allocation unit 560) may analyze various sensor indications and/or various combinations of sensor indications and/or one or more sensor indications over time (e.g., one or more differences in one or more sensor indications at different times) to affect communication operation of the UE 500. The processor 510 may determine whether communication may be compromised, e.g., in a certain direction due to, for example, an object and may determine to reduce communication resource(s) in that direction. As another example, the processor 510 may determine to reduce communication generally, e.g., processing power and/or transmission power, for one or more reasons such as lack of recipients of information, communication priority of another entity (e.g., another UE such as an emergency vehicle). Numerous reasons for affecting communication and numerous ways of affecting communication are possible, some of which are discussed herein as examples. Communication may be affected temporarily, e.g., while a transient condition exists, and communication processing returned to a previous condition once the condition no longer exists.

The processor 510 may be configured to affect communication directionality. For example, the processor 510 may be configured to implement beam management of the interface 520. For example, the processor 510 may be configured to control the interface 520 to select one or more beams (e.g., one or more beams 671, 672, 673, 674, 675, 676 of the UE 623) corresponding to one or more desired directions for transmitting and/or receiving signals. Also or alternatively, the processor 510 may be configured to cause the interface 520 to affect an antenna pattern of one or more beams (e.g., to focus or broaden a mainbeam). Also or alternatively, the processor 510 may be configured to cause the interface 520 to implement beam steering to direct one or more beams as desired. Also or alternatively, the processor 510 may be configured to cause the interface 520 to provide more or less transmit power for one or more beams, respectively, and/or for one or more transmission signals, respectively (e.g., different beams and/or different signals may be transmitted with different powers). Also or alternatively, the processor 510 may be configured to cause the interface 520 to increase or reduce a transmit frequency or periodicity for one or more beams, respectively, and/or for one or more transmission signals, respectively (e.g., different beams and/or different signals may be transmitted with different frequencies or periodicities). For example, the processor 510 may increase transmission frequency (reduce periodicity) in one or more desired directions and/or reduce frequency (increase periodicity) of transmissions in one or more undesired directions. Also or alternatively, the processor 510 may be configured to process signals from selected beams in order to process signals received from one or more desired directions. Also or alternatively, the processor 510 may be configured not to process signals from one or more beams (e.g., not from one or more entire antennas of the interface 520) in order not to process signals received from one or more undesired directions. Also or alternatively, the processor 510 may be configured to control the interface 520 not to provide one or more particular signals to the processor 510 and/or not to provide signals from one or more beams (e.g., not from one or more entire antennas of the interface 520) to the processor 510 in order to inhibit or prevent processing of signals received from one or more undesired directions. Affecting the directionality may affect multiple directions, e.g., increasing transmit power in one direction and reducing (e.g., eliminating) transmit power in another direction.

Also or alternatively, the processor 510 may be configured to affect communication operation by affecting one or more transmission parameters. For example, the processor 510 may be configured to control a transmission power of one or more beams and/or one or more signals transmitted by the interface 520. Also or alternatively, the processor 510 may be configured to control a transmission frequency (periodicity) for one or more signals and/or one or more beams. Also or alternatively, the processor 510 may be configured to increase or reduce a quantity of signals transmitted.

Also or alternatively, the processor 510 may be configured to affect communication operation by affecting processing effort or processing level of the processor 510. For example, the processor 510 may be configured to control which signals (for transmission and/or that are received) are processed by the processor 510, how much processing resources (e.g., power and/or memory) are made available or used to process (e.g., transmit or measure) one or more particular signals, and/or how much time is made available or allocated for processing one or more particular signals.

Also or alternatively, the processor 510 may affect sensor integration priority, e.g., change pre-defined terms and/or data used in an artificial intelligence (AI) algorithm or neural network. The sensor information obtained by the processor 510 may be used by the processor 510 to guide one or more AI algorithms run by the processor 510 for using the sensor information. For example, the sensor information may affect the AI algorithm(s) which may result in the processor 510 directing operation of the UE 500 differently when the UE 500 is at rest and parked (e.g., the vehicle is in park) compared to when the UE 500 is at rest at a traffic light (e.g., the vehicle is in drive but the brake is applied).

Example Scenarios

Figure 7:
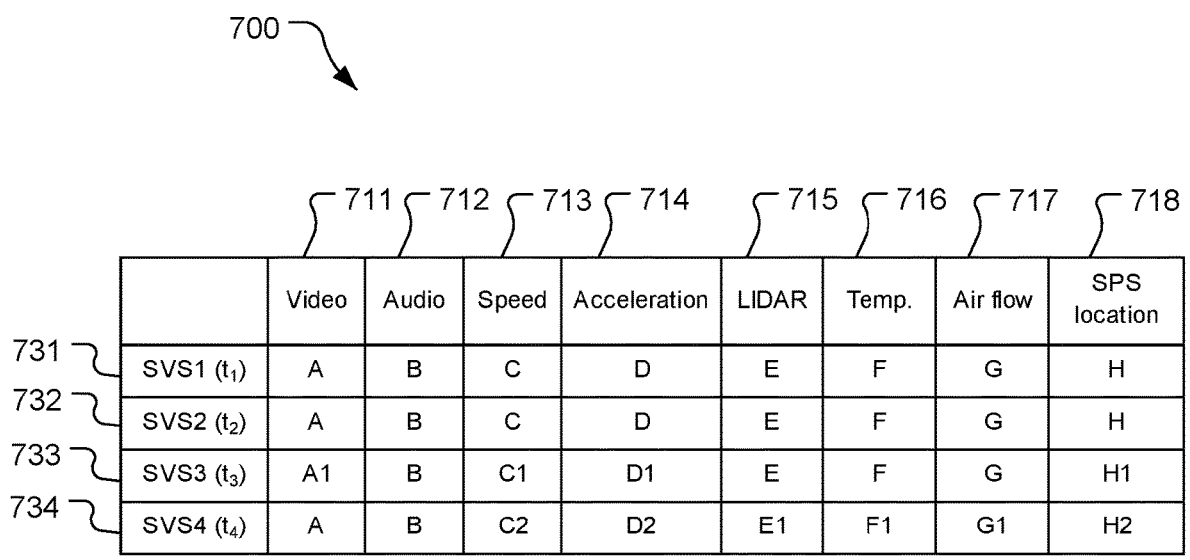
FIG. 7 is an example table of sensor information.

Referring also to FIG. 7, a table 700 of sensor values includes values at different times corresponding to various sensor information. In this example, the sensor information includes fields of video 711, audio 712, speed 713, acceleration 714, LIDAR 715, temperature 716, air flow 717, and SPS location 718. The table 700 is a very simple example, with each field showing a variable indicative of a sensor value, and with the table 700 including only one sensor indication for each type of information, and with far fewer types of sensor information included than may be used. The table 700 is thus a simplified example only, provided to give a relatively uncomplicated example of such information and from which a few examples of determined resource allocation are discussed. In the table 700, four sensor value sets (SVS) 731, 732, 733, 734 comprise respective values of each of the sensor information fields 711-718 measured (or determined from measurements taken) at different times $t_1$, $t_2$, $t_3$, $t_1$, respectively. Differences between the times are arbitrary and may be any number of amounts of times (e.g., one second, 10 seconds, 500 ms, etc.), and may be different between different pairs of the sensor value sets 731-734. The examples below are based on values in the table 700 and are examples only and not limiting of the aspects and features of the disclosure or the claims. The examples are for a UE at rest, a UE in forward motion, and a UE slowing forward motion. Clearly, numerous other examples are possible, e.g., rearward motion, slowing rearward motion, increasing forward motion, increasing rearward motion, etc. Further, the discussion regarding the examples is not limited to these examples, and thus the discussion (e.g., capabilities of the UE 500) has applicability beyond these examples, e.g., to the UE 500 generally.

The processor 510 (e.g., the communication resource allocation unit 560) may analyze the sensor values of the table 700 to determine allow to allocate one or more communication resources, and implement the determined allocation. For example, the processor 510 may analyze one or more individual sensor values in the table 700, one or more of the sensor value sets 731-734, two or more of the values within one or more of the sensor value sets 731-734, and/or combinations of two or more of the sensor value sets 731-734. For example, the processor 510 may determine and analyze one or more differences between sensor value sets (one or more changes from one sensor value set to another sensor value set) such as a first difference between the sensor value sets 731, 732, a second difference between the sensor value sets 732, 733, and/or a third difference between the sensor value sets 733, 734. The processor 510 may be configured to allocate one or more resources based on one or more values of one or more sensor value sets and/or based on one or more sensor value changes (differences) between sensor value sets. For example, the processor may be configured to allocate one or more resources based on one or more sensor values changing and/or based on the value(s) (e.g., magnitude(s)) of the change(s).

UE at Rest

The processor 510 may determine from the sensor value set 731, the sensor value set 732, and/or from a difference between sensor value sets 731 and 732 that the UE 500 is at rest. For example, the processor 510 may conclude from the sensor value set 731 that the UE 500 is at rest, e.g., in response to the value C of the speed field 713 and the value D of the acceleration field 714 both being zero. As another example, the processor 510 may conclude from the sensor value sets 731, 732 that the UE 500 is at rest, e.g., in response to the values of the speed field 713, the acceleration field 714, and the SPS location field 718 being the same in both of the sensor value sets 731, 732 (a difference being zero) and the value C of the speed field 713 and the value D of the acceleration field 714 both being zero. For example, the UE 500 may be the UE 626 shown in FIG. 6 that is at rest, being parked next to a road 640 and the building 628.

The processor 510 may be configured to determine an amount of other UEs nearby (e.g., within communication range). For example, the processor 510 may analyze information from the video field 711 (e.g., one or more captured images), information from the audio field 712, and/or information from the LIDAR field 715 to determine whether there are any other UEs nearby, and if so how many (e.g., a quantity, a density) other UEs, e.g., vehicles, nearby. Also or alternatively, one or more other types of information (e.g., from a motion sensor) may be used to determine presence of other UEs.

The processor 510 may be configured to allocate one or more communication resources based on the UE 500 being at rest and/or with little UE traffic nearby (e.g., below a threshold quantity of UEs). For example, the UE 500 may respond to determining that the UE 500 is at rest (e.g., the parked UE 626) with less than a threshold amount of nearby UEs by setting a transmit power value or transmit power limit or a receive signal processing power value or receive signal processing limit, reducing transmit and/or receive signal processing power if the present transmit and/or receive power is higher than the respective power value or limit that is set. The processor 510 may adjust the processing power to be more efficient. The processor 510 may set (e.g., alter) one or more transmit and/or receive processing parameters such as periodicity, number of transmissions, which resource blocks (RBs) are transmitted and/or processed if received, a modulation and coding scheme (MCS) implemented by the UE 500, etc. This may help reduce cost, e.g., reduce processing power (e.g., CPU power, edge power) and thus save (conserve) battery power, reduce temperature of the processor 510 (and/or a chip containing the processor 510), and/or increase a life expectancy of the processor 510 (and/or a chip containing the processor 510). The processor 510 may not change operation of the sensor(s) 530 so that the sensor(s) may remain active even after the processor 510 determines that the UE 500 is at rest and there is little nearby traffic so that the processor 510 can determine a change in motion of the UE 500, a change in nearby traffic, and/or another change.

UE in Forward Motion

The processor 510 may determine from the sensor value set 733 and/or from a difference between sensor value sets 732 and 733 that the UE 500 is in forward motion. For example, the processor 510 may conclude from the sensor value set 733 that the UE 500 is in forward motion in response to the value C1 of the speed field 713 and the value D1 of the acceleration field 714 both being positive, non-zero values, or in response to the value C1 being positive regardless of the value D1 (with positive speed values being associated with forward motion and negative values being associated with reverse motion). As another example, the processor 510 may conclude from the sensor value sets 732, 733 that the UE 500 is in forward motion, e.g., in response to the values H, H1 of the SPS location field 718 being different in the two sensor value sets, the values of the video field 711 being different in the two sensor value sets, and the value of the speed field C1 in the sensor value set 733 being positive, and possibly in response to an orientation of the UE 500 being directed from the earlier location toward the later location, e.g., from the location H toward the location H1 (where $t_3$ is after $t_2$).

The processor 510 may be configured to allocate one or more communication resources based on the UE 500 being in forward motion. For example, the processor 510 may affect communication directionality, e.g., including affecting beam management, to allocate more communication resources to a front of the UE 500 and/or in a forward direction. For example, the processor 510 may cause the interface 520 to transmit and/or receive more communication signals and/or with more power to and/or from forward directions (e.g., a sector 660 away from a front of the UE 500, in this example, the UE 623). Also or alternatively, the processor 510 may allocate fewer resources to a rear of the UE 500 and/or in a rearward direction. For example, the processor 510 may cause the interface 520 to transmit and/or receive fewer communication signals and/or with less power to and/or from rearward directions (i.e., directions away from a rear of the UE 500, e.g., a sector 662 of directions away from the rear of the UE 500). The processor 510 may cause the interface 520 to increase transmit power (e.g., to provide more coverage (more area in communication range)) and/or transmit frequency and/or transmit signal quantity in the sector 660. The processor 510 may cause the interface 520 to reduce or prevent forwarding of signals from the sector 662 to the processor 510 for processing. The processor 510 may reduce or stop processing of signals received from the sector 662. The processor 510 may affect processing effort, e.g., increasing processing effort for signals sent to the sector 660 and/or signals received from the sector 660 and/or decreasing processing effort for signals received from the sector 662 and/or signals transmitted in the sector 662. Any of these measures may improve safety, e.g., by providing improved communication with one or more UEs in a direction in which the UE 500, e.g., the UE 623, is moving. The UE 500 may use the allocated resources in a variety of ways, e.g., to notify one or more other UEs of the motion of the UE 500 (e.g., for use in collision avoidance, traffic planning, etc.).

The processor 510 may be configured to allocate one or more communication resources based on the UE 500 being in rearward motion. For example, the processor 510 may be configured to allocate resources in a similar manner as for forward motion, but reversed, e.g., to direct more communication resources toward a rear of the UE 500 and less resources toward a front of the UE 500.

UE in Slowing Forward Motion

The processor 510 may determine from the sensor value set 734 and/or from a difference between sensor value sets 733 and 734 that the UE 500 is in slowing forward motion. For example, the processor 510 may conclude from the sensor value set 734 that the UE 500 is in slowing forward motion in response to the value C2 of the speed field 713 being positive and the value D2 of the acceleration field 714 being negative. As another example, the processor 510 may conclude from the sensor value sets 733, 734 that the UE 500 is in slowing forward motion, e.g., in response to the values C1, C2 of the speed field 713 both being positive and the value C2 being of a lower magnitude than the value C1 (with the time $t_4$ being after the time $t_3$).

The processor 510 may be configured to allocate one or more communication resources based on the UE 500 being in slowing forward motion. For example, the processor 510 may affect communication directionality, e.g., including affecting beam management, to allocate more communication resources to a rear of the UE 500 and/or in a rearward direction (e.g., more than allocated to a front of the UE 500 and/or more than previously allocated to the rear of the UE 500) and to allocate fewer communication resources to a front of the UE 500 and/or in a forward direction (e.g., fewer than allocated to the rear of the UE 500 and/or fewer than previously allocated to the front of the UE 500). The processor 510 may be configured to allocate more resources in one or more directions at least partially toward a direction of motion (travel) and fewer resources in one or more directions at least partially away from a direction of motion.

Object Presence

The processor 510 may be configured to allocate one or more communication resources based on object detection. For example, the processor 510 may be able to analyze one or more measurements in the LIDAR field 715 and/or the air flow field 717 to determine presence of an object, and possibly determine direction of the object relative to the UE 500 and/or size (e.g., width and/or height) of the object. For example, the value E of the LIDAR field 715, e.g., a range value, may indicate that an object is close on the starboard side of the UE 500. Also or alternatively, the processor 510 may use a low air flow and/or a decrease in air flow as at least part of an analysis to determine whether an object is present. Also or alternatively, the processor 510 may use location, e.g., from the SPS location field 718, orientation of the UE 500, and information regarding topography near the location as at least part of an analysis for determining the presence (and direction) of an object. For example, the orientation may be used in conjunction with a location of the UE 500 to determine a direction relative to the UE 500 of an object that may impede communication between the UE 500 and another device such as another UE or a network entity (e.g., a base station or a server). For example, with the UE 500 being the UE 626, the processor 510 may analyze one or more sensor measurements and determine that an object, here the building 628, is on the starboard side of the UE 500 and that the object is a significant impediment to communication. The processor 510 may be configured to determine a size of an object. For example, the processor 510 may use image information from the video field 711 and/or multiple LIDAR measurements (providing distance to an object at different directions) and/or other information to determine the size of the object.

The processor 510 may respond to a determination of object presence (and possibly orientation and/or object size) by affecting one or more characteristics, e.g., the directionality, of communication of the UE. The processor 510 may reduce or even eliminate communication transmission in the direction of the building 628, e.g., a direction 650 (or directions near the direction 650, e.g., in a sector including the direction 650). Also or alternatively, the processor 510 may affect communication transmission and/or reception to be directed away from the detected object, here in a sector 652, especially if the processor 510 knows that a base station, here the base station 610, is in the direction of the sector 652. For example, the processor 510 may select (only) the beam(s) directed in the sector 652 for transmission and/or reception, may process (only) signals from such beam(s), or may direct the interface 520 to use more power when transmitting signals in the sector 652 (e.g., to increase transmit power to the sector 652) (e.g., more than for other sectors and/or more than previously used in the sector 652). Also or alternatively, the processor 510 may reduce communication transmission and/or reception toward the object, e.g., reducing processing power of received signals from that direction, not processing signals received from that direction, reducing transmit power toward the object, preventing transmission of signals toward the object, etc. The UE 500 may use the allocated communication resource(s)

for one or more of a variety of reasons, e.g., to complete cellular calls, to notify one or more other UEs of the presence of and/or location of an object, etc. The allocation of resources (e.g., allocation of beams, allocation of transmission power, etc.) may be affected by the size of an object. For example, presence of a small object may not warrant reduction, or significant reduction, in resources in a direction of the object. As another example, transmission power may be increased toward a small object to overcome loss introduced by the object while transmission power may be reduced (possibly eliminated) toward a large object (e.g., that might block transmissions or introduce so much loss that transmission power used in the direction of the object would be inefficient, e.g., possibly completely wasted). Allocating resources may have one or more beneficial effects, e.g., reduction in heat generated by and/or temperature of the processor 510 and/or a chip containing the processor 510 in response to reduction of resources (e.g., processing power).

The processor 510 may be configured to determine a change from absence to presence of an object. For example, the processor 510 may conclude from the sensor value set 734 that an object is present near the UE 500, e.g., using techniques discussed above. As another example, the processor 510 may determine that an object is currently present, e.g., as discussed above, but was not previously, e.g., by analyzing the sensor value sets 733, 734. For example, the processor 510 may conclude from one or more of the differences between the sensor value sets 733, 734 (one or more changes from the SVS 733 to the SVS 734) that an object is now present (e.g., due to motion of the UE 500 and/or the object (e.g., a large vehicle)) in response to the value of the air flow field 716 decreasing between the sensor value sets 733, 734 and/or the value of the LIDAR field 714 changing between the sensor value sets 733, 734 and/or a value of the video field 711 (e.g., an image) containing an object that was previously absent. The processor 510 may allocate resources accordingly, e.g., to reduce resources in a direction of an object impeding communication and/or to increase allocated resources in one or more directions away from the object. For example, the vehicle 624 may detect the presence of the vehicle 627 and reduce (e.g., stop) transmission in the direction of the vehicle 627.

Specific Object Presence

The UE 500 may be configured to detect presence of one or more particular types of objects, e.g., an emergency vehicle, and allocate communication resources accordingly. For example, the processor 510 may analyze audio input from a microphone, e.g., one or more values of the audio field 712, to detect a siren and/or may analyze one or more values of the video field 711 (e.g., one or more images) and/or other sensor information (e.g., LIDAR output, radar output) to determine that an emergency vehicle such as the fire engine 627 or another emergency vehicle (e.g., a police car, an ambulance) is present. The processor 510 may respond to determination of presence of an emergency vehicle by, for example, reducing or stopping communication transmissions, and/or reducing transmit power, at least temporarily and/or using beam management to help avoid interference between communications from the UE 500 and communications to and/or from the emergency vehicle. This may help improve emergency vehicle communication coverage, e.g., CV2X coverage, and/or reliability. Alternatively, the UE 500 may allocate more resources directed toward the emergency vehicle, e.g., increasing transmit power and/or transmit frequency toward the emergency vehicle and/or to increase signal processing of signals received from the emergency vehicle. Such action(s) may help increase information exchange with the emergency vehicle, e.g., to help with collision avoidance and/or to help clear a path for the emergency vehicle to move (e.g., to expedite arrival of the emergency vehicle to a desired location).

Lack of Object Presence

The UE 500 may be configured to detect the lack of presence of objects, e.g., fewer than a threshold quantity of objects especially within a threshold distance of the UE 500, and allocate communication resources accordingly. For example, the processor 510 may analyze video, lidar, and/or radar input to determine that there are few or no objects nearby (e.g., if the UE 500 is on a desert road). The processor 510 may respond to determination of lack of presence of (at least a threshold quantity of) objects by, for example, reducing or stopping communication transmissions, and/or reducing transmit power, and/or applying beam forming to focus transmission and/or reception (e.g., to the road and not to the sides of the UE 500 and/or or toward a base station).

Group Mode Operation

The processor 510 may be configured to affect communication resources based on the UE 500 being part of a group of UEs, e.g., a fleet of associated vehicles, a dense set of vehicles (e.g., a traffic jam or traffic congestion), etc. For example, the UEs 620, 621, 623 may be part of a group 670 of associated UEs (e.g., owned by a single entity) and/or that has a density of at least a threshold density (e.g., a threshold quantity of vehicles per distance or area such as three vehicles per 30 m, or a threshold quantity of vehicles within a threshold range of the UE (e.g., five other vehicles each within 10 m of the UE 500). The processor 510 may require that the group have a threshold quantity of vehicles (e.g., three vehicles) to operate in a group mode. The processor 510 may be configured to reduce transmission of redundant information, e.g., transmitted by one or more other UEs in the group of UEs. For example, the processor 510 may not transmit information that was or will be transmitted by another UE in the group 670. The processor 510 may be configured to set a power value (e.g., reduce power if the set power value is higher than a presently-used power) and/or otherwise allocate one or more other communication resources for communicating with one or more other UEs in the group 670, which may conserve power, reduce interference, and/or reduce network loading. Also or alternatively, the processor 510 may relay received information to other UEs in the group 670, which may help reduce processing power for receiving information. Also or alternatively, the processor 510 may be configured to cause the interface 520 not to communicate with base stations, e.g., the base station 610, which may also conserve power, reduce interference, and/or reduce network loading. Group mode operation may be particularly useful with respect to autonomous driving vehicles.

Interior Region Conditions

The processor 510 may be configured to affect communication resources based on one or more conditions inside a region, e.g., vehicle interior conditions inside a passenger compartment of a vehicle UE. For example, if the UE 500 is a vehicle, the processor 510 may determine whether one or more passengers in the passenger compartment show signs of needing assistance. For example, the processor 510 may determine that motion of the driver (e.g., repeated head bobbing) indicates that the driver is falling asleep. The processor 510 may respond to determining that the driver is falling asleep, combined with the UE 500 being in motion, to affect communication, e.g., by providing or increasing transmission power for communication (especially for an emergency communication) to increase coverage area, initiating an emergency call, causing the vehicle to slow, and/or sounding an alarm and/or providing another alert to help prevent the driver from falling asleep. Such action(s) may save lives both of a user of the UE 500 and of other persons, e.g., other passengers of the UE 500 and/or persons that may otherwise be hit by the UE 500. The processor 510 may be configured to use one or more pieces of sensor information in addition to or instead of motion to determine that a passenger, especially the driver, is falling asleep. For example, the processor 510 may analyze audio, e.g., for snoring or other sleep-related sounds, to determine whether a passenger is asleep, and may be able to determine a source of the sounds to determine whether a sleeping passenger is the driver.

Emergency Conditions

The processor 510 may be configured to affect communication resources based on one or more emergency conditions being detected. For example, the processor 510 may detect sudden acceleration from the acceleration field 714, which may be indicative of the UE 500 hitting or being hit by an object. As another example, the processor 510 may analyze the audio field 712 for verbal indications of an emergency, e.g., screams, yells, verbal commands to place an emergency call, etc. As another example, the processor 510 may analyze one or more UE status sensors for indications of UE integrity, e.g., collapsing of one or more vehicle body parts of a vehicle UE, such as a door or a bumper, to determine that a crash has occurred. As another example, the processor 510 may analyze accelerometer and/or gyroscope information to determine that a vehicle UE is rolling, and thus indicative of a crash. The processor 510 may be configured to respond to determination of an emergency condition by, for example, providing or increasing transmission power for communication (especially for an emergency communication), initiating an emergency call, causing a speaker of the vehicle to play an inquiry for information (e.g., "Do you need emergency assistance?") from the passenger(s), and/or sounding an alarm. Such action(s) may save lives, e.g., by getting medical aid to passengers faster than without such action(s).

Operation

Figure 8:
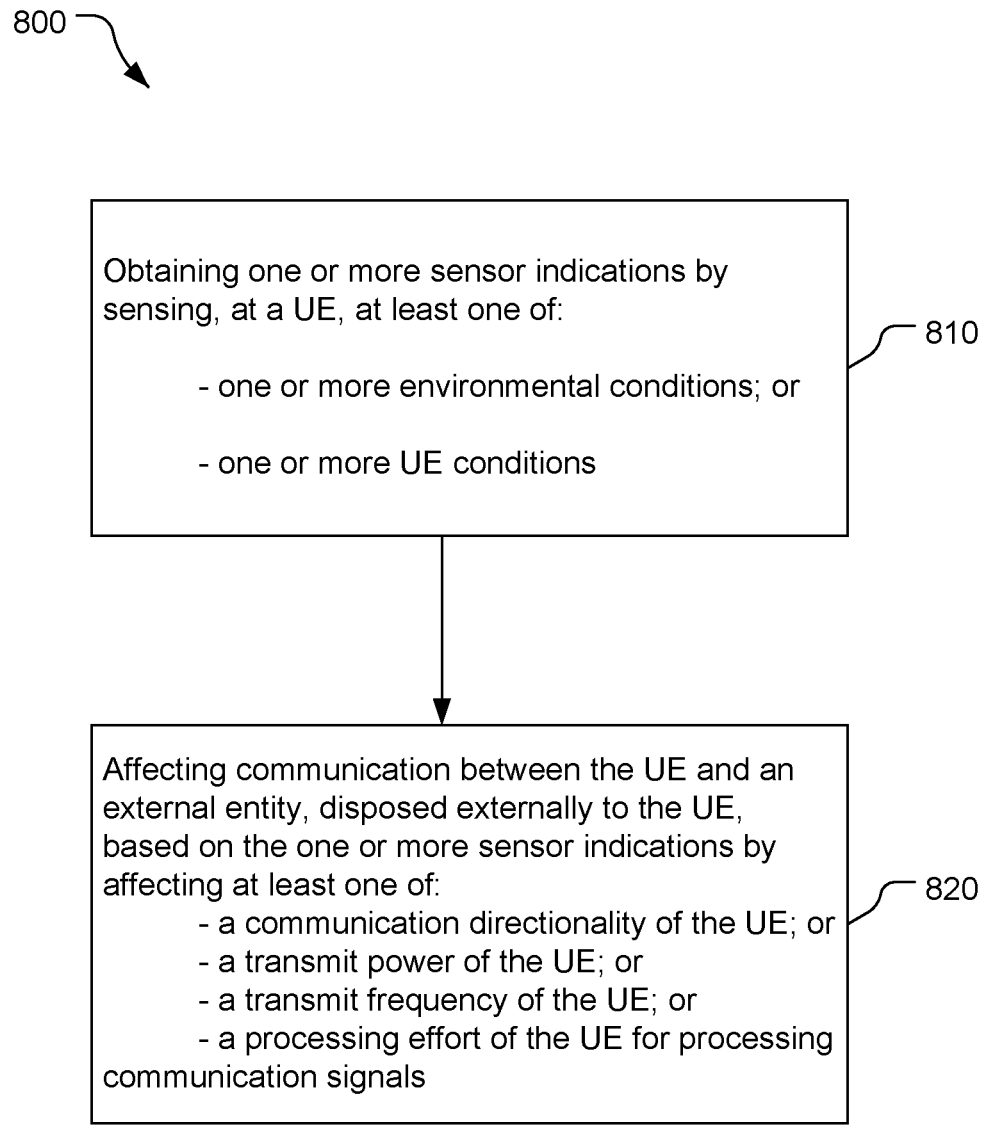
FIG. 8 is a block flow diagram of a method for managing communication resources.

Referring to FIG. 8, with further reference to FIGS. 1-7, a method 800 of managing communication resources includes the stages shown. The method 800 is, however, an example only and not limiting. The method 800 may be altered, e.g., by having stages added, removed, rearranged, combined, performed concurrently, and/or having single stages split into multiple stages.

At stage 810, the method 800 includes obtaining one or more sensor indications by sensing, at a UE, at least one of: one or more environmental conditions; or one or more UE conditions. The UE 500 may, for example, be a vehicle or otherwise associated with a vehicle, e.g., disposed on or in a vehicle, or integrated with a vehicle, etc., or may be independent of a vehicle. The environmental condition(s) may be associated with the UE by, for example, being in or near the UE (e.g., within a distance such that the environment may be considered regarding communication to and/or from the UE). The processor 510 may monitor the sensor(s) 540 for one or more conditions outside and/or inside the UE 500 and distinct from the UE 500 (e.g., distinct from a vehicle). For example, the processor 510 may monitor one or more camera images (e.g., still and/or video images of one or more regions visible from the UE 500), audio, temperature, air flow, ranging information (e.g., from radar, LIDAR, etc.), motion, etc. Also or alternatively, the processor 510 may monitor the sensor(s) 540 for one or more conditions of the UE 500 such as location, orientation, movement, UE status (e.g., vehicle status such as gear, brake on/off, accelerator position, steering wheel position, turn indicator(s) on/off, etc.). The processor 510, the memory 530, and one or more of the sensor(s) 540 may comprise means for obtaining one or more sensor indications.

At stage 820, the method 800 includes affecting communication between the UE and an external entity, disposed externally to the UE, based on the one or more sensor indications by affecting at least one of: a communication directionality of the UE; or a transmit power of the UE; or a transmit frequency of the UE; or a processing effort of the UE for processing communication signals. For example, the processor 510 may affect a transmit direction of communication signals using beam management, e.g., selecting one or more antennas to use for signal transmission (e.g., controlling which antenna(s) receive power or which antenna(s) receive signals to be transmitted), controlling beam steering by one or more antennas, etc. As another example, the processor 510 may affect received signal processing, e.g., by controlling which antennas provide received signals to the processor 510, which received signals are processed by the processor 510, by controlling beam steering to affect quality of received signals, etc. Also or alternatively, the processor 510 may determine and control how much power to use to process signals to be transmitted and/or received signals (e.g., bandwidth allocated, processing time allocated). The processor 510, the interface 520, the memory 530, and one or more of the sensor(s) 540 may comprise means for affecting communication between the UE and the external entity.

Implementations of the method 800 may include one or more of the following features. In an example implementation, the method 800 may include determining that an object is present at an object direction relative to the UE, where affecting communication between the UE and the external entity comprises at least one of: reducing a communication transmit directionality of the UE in the object direction; or reducing a communication receive directionality of the UE in the object direction. For example, to reduce communication transmit directionality, the processor 510 may reduce frequency and/or reduce power for transmissions in the direction of the object. As other examples, the processor 510 may perform beam management, e.g., by affecting beam forming by at least one transceiver of the UE 500 and/or affecting beam selection by the at least one transceiver. The UE 500 may, e.g., focus one or more beams away from the object and/or select one or more beams directed toward the object for non-transmission, or change the direction of one or more beams to point away from the object, etc., to reduce the transmission directionality toward the object. To reduce receive directionality, the processor 510 may, for example, reduce processing power and/or time dedicated to reception of signals from the direction of the object. As other examples, the processor 510 may reduce or eliminate processing of from the direction of the object, e.g., by sending only signals not from the object direction to the processor 510 for processing. The processor 510, the memory 530, and one or more of the sensor(s) 540 may comprise means for determining that an object is present at the object direction, and the processor, the interface 520, and the memory 530 may comprise means for affecting the communication directionality.

Also or alternatively, implementations of the method 800 may include one or more of the following features. In an example implementation, affecting the communication may include responding to acceleration of the UE in a first direction by increasing communication transmission in the first direction and/or increasing communication reception in the first direction and/or reducing communication transmission in a second direction that is opposite the first direction and/or reducing communication reception in the second direction. For example, the processor 510 may increase transmit power, frequency, and/or quantity of communication in or near a direction of travel and/or may increase processing power and/or processing time for received signals, and/or directionality for receiving signals in or near the direction or travel. Also or alternatively, the processor 510 may reduce one or more of these features in or near a direction opposite that of the direction of travel. In another example implementation, affecting communication between the UE and the external entity may include reducing communication transmission in response to determination of presence of an emergency vehicle by the UE. For example, the processor 510 may sense the presence of an emergency vehicle (e.g., by analyzing information from one or more of the sensor(s) 540) and/or may be informed of the presence of the emergency vehicle (e.g., by receiving an indication of the emergency vehicle, e.g., from a base station or from the emergency vehicle itself)). For example, the processor 510 may analyze one or more images captured by a camera of the sensor(s) 540 and/or one or more indications of sound output by a microphone of the sensor(s) 540 to determine the presence of the emergency vehicle (e.g., by identifying an emergency vehicle shape and/or sound (e.g., siren)). The processor 510 may reduce communication in response to determination of the presence of the emergency vehicle, e.g., to reduce interference with the emergency vehicle communication. The processor 510, the memory 530, and possibly one or more of the sensor(s) 540 and/or the interface 520 may comprise means for determining presence of an emergency vehicle and the processor, the memory 530, and possibly the interface 520 may comprise means for reducing communication transmission.

Also or alternatively, implementations of the method 800 may include one or more of the following features. In an example implementation, affecting communication between the UE and the external entity may include affecting communication transmission by the UE based on UE status (e.g., vehicle status) indicated by the one or more sensor indications and/or increasing communication transmission by the UE based on passenger status indicated by the one or more sensor indications and/or reducing communication transmission by the UE in response to determining that the UE is a member of a group of associated UEs and/or reducing communication transmission by the UE based on an environment proximate to the UE. For example, regarding vehicle status, the processor 510 may use a gear selection, a brake status, an accelerator status, whether a turn signal is active, whether emergency/hazard flashers are active, whether a stopped vehicle is in park or drive, status of vehicle condition sensors (e.g., airbag(s) deployed, bumper moved, car panel(s) and/or frame damaged), etc. to determine whether and how to affect communication appropriately, e.g., by increasing transmit communication. As another example, the processor 510 may increase communication based on passenger status (e.g., a driver being asleep or otherwise impaired), e.g., to help with collision avoidance, notify an emergency service, etc. As another example, the processor 510 may determine to reduce communication transmission in response to determining that the UE 500 is part of a group of UEs, e.g., a group of vehicles with similar characteristics (e.g., similar status (e.g., location, speed, direction)), and at least one of the other UEs is providing communication transmission similar to (e.g., identical to) what the UE 500 would provide (e.g., such that the communication from the UE 500 may be redundant). As another example, the processor 510 may determine to reduce communication transmission based on an environment proximate to the UE (e.g., within sensing range of one or more environmental sensors of the UE 500 and/or within a threshold distance of the UE 500). For example, the UE 500 may determine whether the UE is in heavy traffic (e.g., in a region with a vehicle density above a threshold) or in an area of high object density (e.g., a density of communication-affecting objects being above a threshold density) or in an area of low object density. The UE 500 may determine such information from one or more sensor measurements and/or one or more received communications.

Also or alternatively, implementations of the method 800 may include one or more of the following features. In an example implementation, the method 800 may include allocating one or more communication resources of the UE based on one or more changes in one or more of the sensor indications. For example, the processor 510 may analyze multiple sensor indications, e.g., multiple sensor value sets, to determine a change in value output by a sensor, or changes in outputs of multiple sensors. The processor 510 may use the change(s) to allocate one or more resources, e.g., to beam steer away from a direction that becomes blocked, to increase transmit power in a direction of increased movement, or to reduce or eliminate transmit power in a direction away from increased movement. These are examples only, and numerous sensor value changes may be used alone or in various combinations to determine various resources allocations. The processor 510 and the memory, and possibly one or more of the sensor(s) 540 and/or the interface 520, may comprise means for allocating one or more communication resources of the UE.

IMPLEMENTATION EXAMPLES

Non-exhaustive implementation examples are provided in the following numbered clauses.

1. A user equipment (UE) comprising:
   at least one transceiver configured to send and receive wireless signals, the at least one transceiver comprising one or more antennas;
   a memory;
   one or more sensors configured to provide one or more sensor indications, the one or more sensors comprising at least one of:
   one or more first sensors configured to sense one or more environmental conditions; or
   one or more second sensors configured to sense one or more UE conditions; and at least one processor communicatively coupled to the at least one transceiver, the memory, and the one or more sensors and configured to control operation, for communication with an entity external to the UE, of at least one of the at least one processor or the at least one transceiver based on the one or more sensor indications provided by the one or more sensors to affect at least one of:
 a communication directionality of the UE; or
 a transmit power of the at least one transceiver; or
 a transmit frequency of the at least one transceiver; or
 a processing effort of the at least one processor for processing communication signals.

2. The UE of clause 1, wherein the at least one processor is configured to determine an object direction of an object relative to the UE and to affect the communication directionality of the UE, and wherein to affect the communication directionality of the UE the at least one processor is configured to at least one of:
 reduce a communication transmit directionality of the UE in the object direction; or
 reduce a communication receive directionality of the UE in the object direction.

3. The UE of clause 2, wherein to affect the communication directionality of the UE the at least one processor is configured to at least one of:
 affect beam forming by the at least one transceiver; or
 affect beam selection by the at least one transceiver.

4. The UE of clause 1, wherein the at least one processor is configured to affect the communication directionality of the UE, and wherein to affect the communication directionality of the UE the at least one processor is configured to at least one of:
 respond to acceleration of the UE in a first direction by increasing communication transmission in the first direction; or
 respond to acceleration of the UE in the first direction by increasing communication reception in the first direction; or
 respond to acceleration of the UE in the first direction by reducing communication transmission in a second direction that is opposite the first direction; or
 respond to acceleration of the UE in the first direction by reducing communication reception in the second direction.

5. The UE of clause 1, wherein the at least one processor is configured to reduce communication transmission in response to determination of presence of an emergency vehicle by the UE.

6. The UE of clause 5, wherein the one or more first sensors include at least one of a camera or a microphone, and wherein the at least one processor is configured to at least one of:
 detect the presence of the emergency vehicle by analyzing one or more images captured by the camera; or
 detect the presence of the emergency vehicle by analyzing output of the microphone.

7. The UE of clause 1, wherein the at least one processor is configured to at least one of:
 affect communication transmission by the UE based on UE status as indicated by the one or more second sensors; or
 increase communication transmission by the UE based on status of a vehicle passenger as indicated by the one or more second sensors; or
 reduce communication transmission in response to the at least one processor determining that the UE is a member of a group of associated UEs; or
 reduce communication transmission by the UE based on an environment proximate to the UE.

8. The UE of clause 1, wherein the at least one processor is configured to allocate one or more communication resources of the UE based on one or more changes in one or more of the one or more sensor indications.

9. The UE of clause 1, wherein the UE comprises a vehicle.

10. A user equipment (UE) comprising:
 sensing means for obtaining one or more sensor indications by sensing at least one of:
 one or more environmental conditions; or
 one or more UE conditions; and
 communication means for affecting communication between the UE and an external entity based on the one or more sensor indications by affecting at least one of:
 a communication directionality of the UE; or
 a transmit power of the UE; or
 a transmit frequency of the UE; or
 a processing effort of the UE for processing communication signals.

11. The UE of clause 10, further comprising means for determining that an object is present at an object direction relative to the UE, wherein the communication means include at least one of:
 means for reducing a communication transmit directionality of the UE in the object direction; or
 means for reducing a communication receive directionality of the UE in the object direction.

12. The UE of clause 11, wherein the communication means include at least one of:
 means for affecting beam forming by at least one transceiver of the UE; or
 means for affecting beam selection by the at least one transceiver.

13. The UE of clause 10, wherein the communication means include responding means for responding to acceleration of the UE in a first direction, the responding means including at least one of:
 means for increasing communication transmission in the first direction; or
 means for increasing communication reception in the first direction; or
 means for reducing communication transmission in a second direction that is opposite the first direction; or
 means for reducing communication reception in the second direction.

14. The UE of clause 10, wherein the communication means are for affecting communication between the UE and the external entity by reducing communication transmission in response to determination of presence of an emergency vehicle by the UE.

15. The UE of clause 14, further comprising means for determining the presence of the emergency vehicle by at least one of:
 analyzing one or more images captured by a camera of the UE; or
 analyzing output of a microphone, of the UE, indicative of sound received by the UE.

16. The UE of clause 10, wherein the communication means include at least one of:
 means for affecting communication transmission by the UE based on UE status determined by the sensing means; or means for increasing communication transmission by the UE based on status of a vehicle passenger determined by the sensing means; or means for reducing communication transmission by the UE in response to determining that the UE is a member of a group of associated UEs; or means for reducing communication transmission by the UE based on an environment proximate to the UE.

17. The UE of clause 10, wherein the communication means are for allocating one or more communication resources of the UE based on one or more changes in one or more of the one or more sensor indications.

18. The UE of clause 10, wherein the UE comprises a vehicle.

19. A method of managing communication resources of a user equipment (UE), the method comprising:
 obtaining one or more sensor indications by sensing, at the UE, at least one of:
 one or more environmental conditions; or
 one or more UE conditions; and
 affecting communication between the UE and an external entity, disposed externally to the UE, based on the one or more sensor indications by affecting at least one of:
 a communication directionality of the UE; or
 a transmit power of the UE; or
 a transmit frequency of the UE; or
 a processing effort of the UE for processing communication signals.

20. The method of clause 19, further comprising determining that an object is present at an object direction relative to the UE, wherein affecting communication between the UE and the external entity comprises at least one of:
 reducing a communication transmit directionality of the UE in the object direction; or
 reducing a communication receive directionality of the UE in the object direction.

21. The method of clause 20, wherein affecting communication between the UE and the external entity comprises at least one of:
 affecting beam forming by at least one transceiver of the UE; or
 affecting beam selection by the at least one transceiver.

22. The method of clause 19, wherein affecting communication between the UE and the external entity comprises responding to acceleration of the UE in a first direction by at least one of:
 increasing communication transmission in the first direction; or
 increasing communication reception in the first direction; or
 reducing communication transmission in a second direction that is opposite the first direction; or
 reducing communication reception in the second direction.

23. The method of clause 19, wherein affecting communication between the UE and the external entity comprises reducing communication transmission in response to determination of presence of an emergency vehicle by the UE.

24. The method of clause 19, wherein affecting communication between the UE and the external entity comprises at least one of:
 affecting communication transmission by the UE based on UE status indicated by the one or more sensor indications; or
 increasing communication transmission by the UE based on passenger status indicated by the one or more sensor indications; or
 reducing communication transmission by the UE in response to determining that the UE is a member of a group of associated UEs; or
 reducing communication transmission by the UE based on an environment proximate to the UE.

25. A non-transitory, processor-readable storage medium comprising processor-readable instructions configured to cause one or more processors of a user equipment (UE) to:
 obtain one or more sensor indications of at least one of:
 one or more environmental conditions; or
 one or more UE conditions; and
 affect communication between the UE and an external entity, disposed externally to the UE, based on the one or more sensor indications by affecting at least one of:
 a communication directionality of the UE; or
 a transmit power of the UE; or
 a transmit frequency of the UE; or
 a processing effort of the UE for processing communication signals.

26. The storage medium of clause 25, further comprising instructions configured to cause the one or more processors to determine that an object is present at an object direction relative to the UE, wherein to affect communication between the UE and the external entity the instructions are configured to cause the one or more processors to at least one of:
 reduce a communication transmit directionality of the UE in the object direction; or
 reduce a communication receive directionality of the UE in the object direction.

27. The storage medium of clause 25, wherein to affect communication between the UE and the external entity the instructions are configured to cause the one or more processors to at least one of:
 affect beam forming by at least one transceiver of the UE; or
 affect beam selection by the at least one transceiver.

28. The storage medium of clause 25, wherein to affect communication between the UE and the external entity the instructions are configured to cause the one or more processors to at least one of:
 respond to acceleration of the UE in a first direction by increasing communication transmission in the first direction; or
 respond to acceleration of the UE in the first direction by increasing communication reception in the first direction; or
 respond to acceleration of the UE in the first direction by reducing communication transmission in a second direction that is opposite the first direction; or
 respond to acceleration of the UE in the first direction by reducing communication reception in the second direction.

29. The storage medium of clause 25, wherein the instructions configured to cause the one or more processors to affect communication between the UE and the external entity comprise instructions configured to cause the one or more processors to reduce communication transmission in response to presence of an emergency vehicle.

30. The storage medium of clause 25, wherein to affect communication between the UE and the external entity the instructions are configured to cause the one or more processors to at least one of:
 affect communication transmission by the UE based on UE status; or
 increase communication transmission by the UE based on status of a vehicle passenger; or reduce communication transmission by the UE in response to determining that the UE is a member of a group of associated UEs; or reduce communication transmission by the UE based on an environment proximate to the UE.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment (UE) comprising:
    at least one transceiver configured to send and receive wireless signals, the at least one transceiver comprising one or more antennas;
    a memory;
    one or more sensors configured to provide one or more sensor indications, the one or more sensors comprising at least one of:
        one or more first sensors configured to sense one or more environmental conditions; or
        one or more second sensors configured to sense one or more UE conditions; and
    at least one processor communicatively coupled to the at least one transceiver, the memory, and the one or more sensors and configured to control operation, for communication with an entity external to the UE, of at least one of the at least one processor or the at least one transceiver based on the one or more sensor indications provided by the one or more sensors to affect at least one of:
        a communication directionality of the UE; or
        a transmit power of the at least one transceiver; or
        a transmit frequency of the at least one transceiver; or
        a processing effort of the at least one processor for processing communication signals, and
    wherein the at least one processor is configured to at least one of:
    affect communication transmission by the UE based on UE status as indicated by the one or more second sensors; or
    increase communication transmission by the UE based on status of a vehicle passenger as indicated by the one or more second sensors; or
    reduce communication transmission in response to the at least one processor determining that the UE is a member of a group of associated UEs; or
    reduce communication transmission by the UE based on an environment proximate to the UE.

2. The UE of claim 1, wherein the at least one processor is configured to determine an object direction of an object relative to the UE and to affect the communication directionality of the UE, and wherein to affect the communication directionality of the UE the at least one processor is configured to at least one of:
    reduce a communication transmit directionality of the UE in the object direction; or
    reduce a communication receive directionality of the UE in the object direction.

3. The UE of claim 2, wherein to affect the communication directionality of the UE the at least one processor is configured to at least one of:
    affect beam forming by the at least one transceiver; or
    affect beam selection by the at least one transceiver.

4. The UE of claim 1, wherein the at least one processor is configured to affect the communication directionality of the UE, and wherein to affect the communication directionality of the UE the at least one processor is configured to at least one of:
    respond to acceleration of the UE in a first direction by increasing communication transmission in the first direction; or
    respond to acceleration of the UE in the first direction by increasing communication reception in the first direction; or
    respond to acceleration of the UE in the first direction by reducing communication transmission in a second direction that is opposite the first direction; or
    respond to acceleration of the UE in the first direction by reducing communication reception in the second direction.

5. The UE of claim 1, wherein the at least one processor is configured to reduce communication transmission in response to determination of presence of an emergency vehicle by the UE.

6. The UE of claim 5, wherein the one or more first sensors include at least one of a camera or a microphone, and wherein the at least one processor is configured to at least one of:
    detect the presence of the emergency vehicle by analyzing one or more images captured by the camera; or
    detect the presence of the emergency vehicle by analyzing output of the microphone.

7. The UE of claim 1, wherein the at least one processor is configured to allocate one or more communication resources of the UE based on one or more changes in one or more of the one or more sensor indications.

8. The UE of claim 1, wherein the UE comprises a vehicle.

9. A user equipment (UE) comprising:
    sensing means for obtaining one or more sensor indications by sensing at least one of:
        one or more environmental conditions; or
        one or more UE conditions; and
    communication means for affecting communication between the UE and an external entity based on the one or more sensor indications by affecting at least one of:
        a communication directionality of the UE; or
        a transmit power of the UE; or
        a transmit frequency of the UE; or
        a processing effort of the UE for processing communication signals, and
    wherein the communication means include at least one of:
        means for affecting communication transmission by the UE based on UE status determined by the sensing means; or
        means for increasing communication transmission by the UE based on status of a vehicle passenger determined by the sensing means; or
        means for reducing communication transmission by the UE in response to determining that the UE is a member of a group of associated UEs; or means for reducing communication transmission by the UE based on an environment proximate to the UE.

10. The UE of claim 9, further comprising means for determining that an object is present at an object direction relative to the UE, wherein the communication means include at least one of:
   means for reducing a communication transmit directionality of the UE in the object direction; or
   means for reducing a communication receive directionality of the UE in the object direction.

11. The UE of claim 10, wherein the communication means include at least one of:
   means for affecting beam forming by at least one transceiver of the UE; or
   means for affecting beam selection by the at least one transceiver.

12. The UE of claim 9, wherein the communication means include responding means for responding to acceleration of the UE in a first direction, the responding means including at least one of:
   means for increasing communication transmission in the first direction; or
   means for increasing communication reception in the first direction; or
   means for reducing communication transmission in a second direction that is opposite the first direction; or
   means for reducing communication reception in the second direction.

13. The UE of claim 9, wherein the communication means are for affecting communication between the UE and the external entity by reducing communication transmission in response to determination of presence of an emergency vehicle by the UE.

14. The UE of claim 13, further comprising means for determining the presence of the emergency vehicle by at least one of:
   analyzing one or more images captured by a camera of the UE; or
   analyzing output of a microphone, of the UE, indicative of sound received by the UE.

15. The UE of claim 9, wherein the communication means are for allocating one or more communication resources of the UE based on one or more changes in one or more of the one or more sensor indications.

16. The UE of claim 9, wherein the UE comprises a vehicle.

17. A method of managing communication resources of a user equipment (UE), the method comprising:
   obtaining one or more sensor indications by sensing, at the UE, at least one of:
      one or more environmental conditions; or
      one or more UE conditions; and
   affecting communication between the UE and an external entity, disposed externally to the UE, based on the one or more sensor indications by affecting at least one of:
      a communication directionality of the UE; or
      a transmit power of the UE; or
      a transmit frequency of the UE; or
      a processing effort of the UE for processing communication signals, and
   wherein affecting communication between the UE and the external entity comprises at least one of:
      affecting communication transmission by the UE based on UE status indicated by the one or more sensor indications; or
      increasing communication transmission by the UE based on passenger status indicated by the one or more sensor indications; or
      reducing communication transmission by the UE in response to determining that the UE is a member of a group of associated UEs; or
      reducing communication transmission by the UE based on an environment proximate to the UE.

18. The method of claim 17, further comprising determining that an object is present at an object direction relative to the UE, wherein affecting communication between the UE and the external entity comprises at least one of:
   reducing a communication transmit directionality of the UE in the object direction; or
   reducing a communication receive directionality of the UE in the object direction.

19. The method of claim 18, wherein affecting communication between the UE and the external entity comprises at least one of:
   affecting beam forming by at least one transceiver of the UE; or
   affecting beam selection by the at least one transceiver.

20. The method of claim 17, wherein affecting communication between the UE and the external entity comprises responding to acceleration of the UE in a first direction by at least one of:
   increasing communication transmission in the first direction; or
   increasing communication reception in the first direction; or
   reducing communication transmission in a second direction that is opposite the first direction; or
   reducing communication reception in the second direction.

21. The method of claim 17, wherein affecting communication between the UE and the external entity comprises reducing communication transmission in response to determination of presence of an emergency vehicle by the UE.

22. A non-transitory, processor-readable storage medium comprising processor-readable instructions configured to cause one or more processors of a user equipment (UE) to:
   obtain one or more sensor indications of at least one of:
      one or more environmental conditions; or
      one or more UE conditions; and
   affect communication between the UE and an external entity, disposed externally to the UE, based on the one or more sensor indications by affecting at least one of:
      a communication directionality of the UE; or
      a transmit power of the UE; or
      a transmit frequency of the UE; or
      a processing effort of the UE for processing communication signals, and
   wherein to affect communication between the UE and the external entity the instructions are configured to cause the one or more processors to at least one of:
      affect communication transmission by the UE based on UE status; or
      increase communication transmission by the UE based on status of a vehicle passenger; or
      reduce communication transmission by the UE in response to determining that the UE is a member of a group of associated UEs; or
      reduce communication transmission by the UE based on an environment proximate to the UE.

23. The storage medium of claim 22, further comprising instructions configured to cause the one or more processors to determine that an object is present at an object direction relative to the UE, wherein to affect communication between the UE and the external entity the instructions are configured to cause the one or more processors to at least one of:
reduce a communication transmit directionality of the UE in the object direction; or
reduce a communication receive directionality of the UE in the object direction.

24. The storage medium of claim 22, wherein to affect communication between the UE and the external entity the instructions are configured to cause the one or more processors to at least one of:
affect beam forming by at least one transceiver of the UE; or
affect beam selection by the at least one transceiver.

25. The storage medium of claim 22, wherein to affect communication between the UE and the external entity the instructions are configured to cause the one or more processors to at least one of:
respond to acceleration of the UE in a first direction by increasing communication transmission in the first direction; or
respond to acceleration of the UE in the first direction by increasing communication reception in the first direction; or
respond to acceleration of the UE in the first direction by reducing communication transmission in a second direction that is opposite the first direction; or
respond to acceleration of the UE in the first direction by reducing communication reception in the second direction.

26. The storage medium of claim 22, wherein the instructions configured to cause the one or more processors to affect communication between the UE and the external entity comprise instructions configured to cause the one or more processors to reduce communication transmission in response to presence of an emergency vehicle.

* * * * *